US009466127B2

(12) United States Patent
Lindahl et al.

(10) Patent No.: US 9,466,127 B2
(45) Date of Patent: Oct. 11, 2016

(54) IMAGE ALTERATION TECHNIQUES

(75) Inventors: Aram Lindahl, Menlo Park, CA (US); Kelvin Chiu, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 12/895,725

(22) Filed: Sep. 30, 2010

(65) Prior Publication Data

US 2012/0081382 A1   Apr. 5, 2012

(51) Int. Cl.
*G09G 5/00* (2006.01)
*G06T 11/00* (2006.01)

(52) U.S. Cl.
CPC .................................. *G06T 11/00* (2013.01)

(58) Field of Classification Search
CPC .............................. G06T 11/001; G06T 15/04
USPC ........................................ 345/581, 619, 473
See application file for complete search history.

(56) References Cited

U.S. PATENT DOCUMENTS

| | | | |
|---|---|---|---|
| 5,758,043 A * | 5/1998 | Takizawa et al. ............ 358/1.16 |
| 5,886,697 A * | 3/1999 | Naughton et al. ............ 345/473 |
| 5,917,488 A | 6/1999 | Anderson et al. |
| 6,044,408 A * | 3/2000 | Engstrom et al. ............ 719/328 |
| 6,122,411 A * | 9/2000 | Shen et al. ..................... 382/299 |
| 6,369,822 B1 | 4/2002 | Peevers |
| 6,473,085 B1 * | 10/2002 | Brock et al. ................... 345/502 |
| 6,847,467 B2 | 1/2005 | Obrador |
| 7,050,102 B1 | 5/2006 | Vincent |
| 7,187,401 B2 | 3/2007 | Alhadef et al. |
| 7,412,360 B2 * | 8/2008 | Surazhsky et al. ............... 703/2 |
| 7,586,032 B2 | 9/2009 | Louis |
| 7,830,381 B2 * | 11/2010 | Lundstrom et al. .......... 345/428 |
| 7,924,328 B2 | 4/2011 | Cazier |
| 7,969,447 B2 * | 6/2011 | Scheepers et al. ............ 345/582 |
| 8,015,245 B2 | 9/2011 | Milic-Frayling |
| 8,051,376 B2 | 11/2011 | Adhikari |
| 8,073,203 B2 | 12/2011 | Tang |
| 8,099,462 B2 | 1/2012 | Sheng |
| 2005/0273331 A1 * | 12/2005 | Lu ................................. 704/246 |
| 2006/0072019 A1 | 4/2006 | Stavely et al. |
| 2006/0181537 A1 | 8/2006 | Vasan |
| 2007/0283269 A1 * | 12/2007 | Obrador et al. .............. 715/723 |
| 2008/0012856 A1 * | 1/2008 | Yu et al. ....................... 345/424 |
| 2008/0089525 A1 | 4/2008 | Kauko |
| 2008/0298705 A1 * | 12/2008 | Jeong ............................ 382/254 |
| 2009/0163182 A1 | 6/2009 | Gatti |
| 2009/0184849 A1 | 7/2009 | Nasiri |
| 2009/0207175 A1 * | 8/2009 | Warner ......................... 345/473 |

(Continued)

OTHER PUBLICATIONS

Adobe, "After Effects / Effects and animation presets overview", http://help.adobe.com/en_US/aftereffects/cs/using/WS3878526689cb91655866c1103906c6dea-7c30a.html.*
Adobe, "ADOBE® AFTER EFFECTS® CS4 help".*
"Photoshop Water Tutorial" http://www.secondpicture.com/tutorials/digital_image_processing/photoshop_water_tutorial.html.*
"Animated Spiral Tutorial", http://www.hypnoticaddiction.com/tutorials/63-animated-spiral-tutorial.html.*
Yufen Feng, "Research on Dynamic Water Surface and Ripple Animation", I.J. Information Technology and Computer Science, 2010, 1, 18-24.*

(Continued)

*Primary Examiner* — Devona Faulk
*Assistant Examiner* — Jin Ge
(74) *Attorney, Agent, or Firm* — Blank Rome LLP

(57) ABSTRACT

Various techniques relating to the alteration of image data are provided herein. An electronic device capable of carrying out such techniques may include data processing circuitry configured to receive image data and detect the occurrence of a device operation event (e.g., an audio event, a motion event, a location event, or an image event, and so forth). The data processing circuitry may alter the image data using a full-quality version or a reduced-quality version of an image alteration effect associated with the device operation event, depending on currently available resources.

23 Claims, 18 Drawing Sheets

(56) References Cited

U.S. PATENT DOCUMENTS

| | | |
|---|---|---|
| 2009/0219168 A1 | 9/2009 | Loper |
| 2009/0284541 A1 | 11/2009 | Liu |
| 2010/0045796 A1* | 2/2010 | Fraley et al. ............ 348/143 |
| 2010/0066763 A1 | 3/2010 | MacDougall |
| 2010/0085379 A1 | 4/2010 | Hishikawa |
| 2010/0134485 A1* | 6/2010 | Bhogal et al. ............ 345/419 |
| 2010/0177247 A1* | 7/2010 | Sekulovski et al. ....... 348/602 |
| 2010/0191459 A1* | 7/2010 | Carter et al. ............. 701/208 |
| 2010/0214483 A1* | 8/2010 | Gann et al. ............... 348/578 |
| 2010/0286972 A1* | 11/2010 | Callegari .................. 703/10 |
| 2010/0303146 A1* | 12/2010 | Kamay ..................... 375/240.02 |
| 2010/0315423 A1* | 12/2010 | Ahn et al. ................. 345/426 |
| 2012/0081382 A1* | 4/2012 | Lindahl et al. ........... 345/581 |

OTHER PUBLICATIONS

GPU Gems Chapter 1.*
GPU Gem Chapter 2.*
Adobe, "After Effects Help / Managing and animating shape paths and masks", http://helpx.adobe.com/after-effects/using/animating-shape-paths-masks.html.*
U.S. Appl. No. 12/541,597, filed Aug. 14, 2009, Aram Lindahl et al.
U.S. Appl. No. 12/556,380, filed Sep. 9, 2009, Lindahl.

* cited by examiner

IMAGE ALTERATION TECHNIQUES

BACKGROUND

The present disclosure relates generally to image data processing and, more particularly, to altering image data in response to device operation events.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Consumer electronics increasingly combine multiple functionalities into a single portable electronic device. For example, in many cases cell phones and media players are no longer merely distinct devices, each with their own unique capabilities. Rather, cell phone and media player functionalities are often now merged into one multimedia device with a multitude of capabilities. Indeed, many modern cell phones, digital media players, and even laptop computers are often capable of providing for a number of additional functionalities, which may include: playing video games, providing for GPS location and navigation functions, providing for network communication functions (e.g., e-mail, text messaging, web-surfing, etc.), playing audio files, and displaying image data, the latter of which may include displaying image data (e.g., pictures and/or video files) stored on the electronic device, captured by the electronic device (e.g., using an integrated camera), or streamed and/or downloaded over a network, such as the Internet.

When a user captures or views an image on such an electronic device, the user also may desire to alter such images with their own creative and artistic initiatives. Such altered images may differ in appearance from the original image, but may provide the creator an aesthetically pleasing viewing experience. Most conventional graphics editing environments, however, may require users to manually select image alteration effects, potentially limiting the creative gamut of altered images that may be created. In addition, not all devices may have the same image processing capabilities. Indeed, some electronic devices may have significantly more or significantly less processing bandwidth than others, which could limit the range of potential image alteration effects available to a user.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to the alteration of image data. An electronic device capable of carrying out such techniques may include data processing circuitry configured to receive image data and detect the occurrence of a device operation event (e.g., an audio event, a motion event, a location event, or an image event, and so forth). The data processing circuitry may alter the image data using a full-quality version or a reduced-quality version of an image alteration effect associated with the device operation event, depending on currently available resources.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
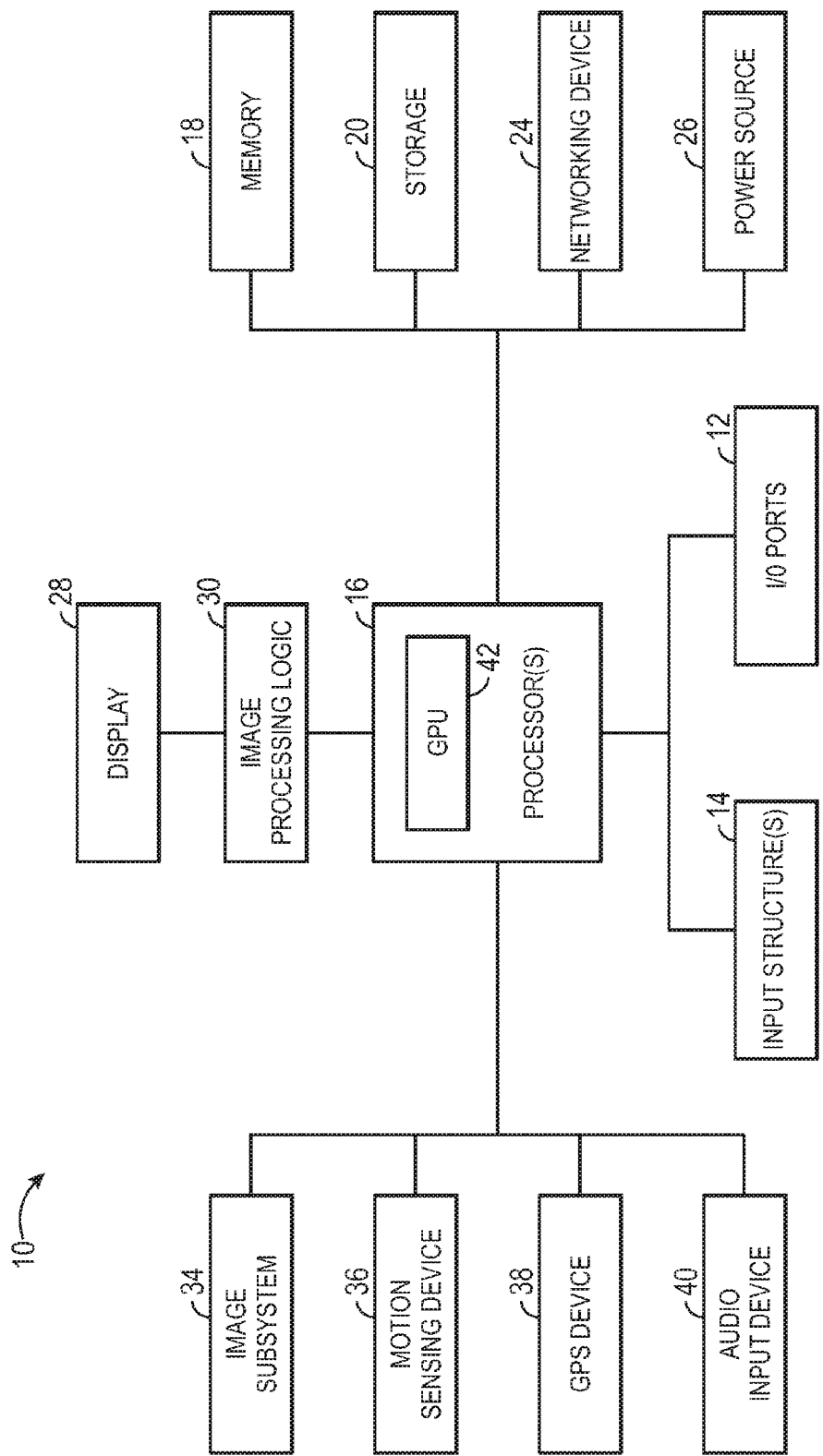
FIG. 1 is a simplified block diagram depicting components of an electronic device that may include image alteration functions, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed above, the creativity of altered image results that may be achieved using conventional graphics editing applications may be limited, as such conventional graphics editing environments may require the manual application of such effects. In addition, various electronic devices may have various image processing capabilities. Accordingly, the present disclosure provides various techniques for automatically applying image alteration effects to image data in response to one or more device operation events and varying the complexity of such image alteration effects depending on the currently available device processing resources of the electronic device. Such image alteration effects may include, for example, those disclosed by U.S. patent application Ser. No. 12/541,597, "IMAGE ALTERATION TECHNIQUES," assigned to Apple Inc. of Cupertino, Calif., which is incorporated herein by reference in its entirety.

Because different electronic devices may have different image processing capabilities, when a user desires to apply such image alteration effects to an image or video, the electronic device may consider its currently available processing resources. Thus, in some embodiments, the electronic device may apply a full-quality version of an image alteration effect only when the currently available device processing resources exceed a threshold. When the currently available device processing resources do not exceed the threshold, the electronic device may apply a reduced-quality version of the same image alteration effect. The electronic device may always apply a full- or reduced-quality version of the image alteration effect depending on its capabilities, or may vary between them as available processing resources change in real time. In this way, the same basic image alteration effect may be used across a variety of electronic devices and/or while the available processing resources of an electronic device increase or decrease over time.

In certain embodiments, the image alteration effects applied to an image in response to a device operation event may take place at a later time, using a different electronic device or using the same electronic device when sufficient device processing resources subsequently have become available. For such embodiments, the electronic device that captures the image data may record and associate the device operation events (e.g., audio events, motion events, location events, imaging events, and so forth, as discussed further below) with the image data by, for example, storing the device operation events as image file metadata. At a later time, the stored image data and associated device operation events may be used to perform image alteration according to such previously recorded device operation events.

Before continuing, several of the terms mentioned above, which will be used extensively throughout the present disclosure, will be first defined in order to facilitate a better understanding of disclosed subject matter. For instance, as used herein, the term "image alteration" or "image manipulation" or the like may be understood to mean the application of an image alteration effect to a digital image, which may be a still image (e.g., picture) or a moving image (e.g., video/movie). An "image alteration effect" may be understood to mean any type of image effect (such as a filter or shape manipulation effect) that alters or otherwise changes the appearance of an original image to which the image alteration effect is applied.

By way of example only, such image alteration effects may include any one of the various effects provided in the Photo Booth® software program (available from Apple Inc. of Cupertino, Calif.), such as sepia, black and white, glow, colored pencil, thermal camera, x-ray, pop art, comic, bulge, dent, twirl, squeeze, mirror, light tunnel, fisheye, or stretch effects, to name just a few. Image alteration effects may also include other types of effects, such as a water reflection effect, a water ripple effect, a spiral effect, a depth-changing ("zooming") effect, a brush-stroke effect, a night vision effect, and more. Thus, it should be understood that "image alteration" does not necessarily mean that the original image data is permanently modified, but rather that an image alteration effect is applied to the image data, such that the desired alteration effect is visible when the image data is displayed by an electronic device for viewing a by user. Additionally, it should be understood that the application of an "image alteration effect" means that the applied effect changes the appearance of the image data in some way other than merely altering the orientation of the image (e.g., switching from a portrait to a landscape view), as displayed on an electronic device.

Further, the term "device operation event" or the like shall be understood to refer to certain events that occur during operation of the electronic device mentioned above, which may be used to trigger the application of an image alteration effect to a particular image. For instance, as will be discussed below, device operation events may include audio events, which may include certain audio properties detected during audio playback (e.g., a music file or the audio portion of a video file) or by analyzing audio signals received through an audio input device (e.g., a voice recording received via a microphone). Device operation events may also include motion-related events detected by a motion sensing device, such as an accelerometer. In further embodiments, image alteration effects may also be triggered by location events (e.g., determined by global positioning satellite (GPS) coordinates) and/or by image capture events, which may include the detection of certain lighting conditions, exposure values, sharpness data, etc., via an imaging subsystem of the electronic device. An image capture event may also include detecting the presence of a new object or subject entering the imaging acquisition frame. Accordingly, the term "image alteration rule" or the like shall be understood to refer to a defined relationship (e.g., defined through user preference settings) by which a particular device operation event triggers a particular image alteration effect. Further, it should be understood that a "device operation event" may refer to the occurrence of a single discrete event, or may refer to a continuous change in a particular parameter over time, such that image alteration is based upon the change in the parameter. It should also be understood that "device operation events" are meant to exclude specific "on-demand" user commands or inputs that directly request the application of an image alteration effect to image data, such as those received directly through a graphics editing program or setting, as discussed above.

As noted above, embodiments of the present disclosure may involve applying varying levels of image alteration effects depending on the currently available device processing resources. Thus, while a "full-quality version" of an image alteration effect may be sometimes applied, a "reduced-quality version" of the image alteration effect may be applied at other times. Accordingly, the term "full-quality version" of an image alteration effect should be understood to refer to the application of a particular an image alteration effect in full (i.e., without purposeful reduction in complexity). Likewise, the term "reduced-quality version" should be understood to refer to the application of an image alteration effect with reduced complexity from the "full-quality version." That is, although a "full-quality version" of an image alteration effect generally may be perceived by a user to be of higher quality (e.g., more aesthetically pleasing or more realistic), the "reduced-quality version" of such an image alteration effect should require fewer device resources while producing a similar effect as the "full-quality version" of the image alteration effect. By way of example, a "full-quality version" of a water ripple effect may involve water simulation that includes randomization, attenuation, and/or calculations of physics, while a "reduced-quality version" may involve simple sine waves.

As noted above, the currently available device processing resources may affect whether a "full-quality version" or a "reduced-quality version" of an image alteration effect is applied. As used herein, the terms "currently available device processing resources," "processing bandwidth," and the like refer to a current capability of an electronic device to process data (e.g., a capability to perform a particular image alteration effect). By way of example, the current capability of an electronic device to process data may be impacted by a current CPU processing load (e.g., an amount of idle time), a current GPU processing load (e.g., a current workload), currently available memory resources (e.g., a total amount of memory or an available bandwidth of memory), and/or current available storage capacity.

With the foregoing in mind, FIG. 1 is a block diagram illustrating an example of an electronic device 10, which may implement the image alteration techniques discussed herein. The electronic device 10 may be any type of electronic device that includes capabilities for displaying image data, which may include still images (e.g., pictures) or moving images (e.g., video), such as a portable media player, a mobile phone, a laptop computer, or the like. By way of example only, the electronic device 10 may be a portable electronic device, such as a model of an iPod®, iPhone®, or iPad® available from Apple Inc. In another embodiment, the electronic device 10 may be a desktop or laptop computer, including a MacBook®, MacBook® Pro, MacBook Air®, iMac®, Mac® Mini, or Mac Pro®, also available from Apple Inc. In further embodiments, the electronic device 10 may be a model of an electronic device from another manufacturer that is capable of displaying image data. As will be discussed further below, the electronic device 10 may include circuitry or logic (e.g., image processing logic 30) configured to process image data in response to one or more device operation events, which may include audio-related events, motion-related events, location-related events, or image capture events, to name just a few.

As shown in FIG. 1, the electronic device 10 may include various internal and/or external components which contribute to its function. Those of ordinary skill in the art should appreciate that the various functional blocks shown in FIG. 1 may represent hardware elements (including circuitry), software elements (including computer code stored on a computer-readable medium) or a combination of both hardware and software elements. It should further be noted that FIG. 1 is merely one example of a particular implementation and is intended to illustrate the types of components that may be present in the electronic device 10. For example, in the presently illustrated embodiment, these components may include input/output (I/O) ports 12, input structures 14, one or more processors 16, memory 18, nonvolatile storage 20, one or more networking devices 24, a power source 26, a display 28, and image processing logic 30. The electronic device 10 may additionally include an imaging subsystem 34, a motion sensing device 36, a positioning device 38, and an audio input device 40, all of which may contribute to operation events that may be utilized by imaging processing logic 30 to trigger the application of one or more image alteration effects to certain image data.

Before continuing, it should be noted that the image processing logic 30, the processor(s) 16, the GPU 42, and/or other data processing circuitry of the electronic device 10 generally may be referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within electronic device 10. Additionally or alternatively, the data processing circuitry may be partially embodied within electronic device 10 and partially embodied within another electronic device connected to the electronic device 10.

With regard to each of the illustrated components, the I/O ports 12 may include ports configured to connect to a variety of external devices, such as headphones or other electronic devices. The input structures 14 may provide user input or feedback to processor(s) 16. For example, the input structures 14 may include buttons, sliders, switches, and so forth. In certain embodiments, the input structures 14 may include a touch-sensitive mechanism of the display 28.

In the electronic device 10 of FIG. 1, the processor(s) 16 and/or other data processing circuitry may be operably coupled to the memory 18 and the nonvolatile storage 20 to carry out the presently disclosed techniques. These techniques may be carried out by the processor(s) 16 (e.g., the GPU 42) and/or other data processing circuitry (e.g., firmware or software associated with the image process logic 30) based on certain instructions executable by the processor(s) 16 and/or other data processing circuitry. Such instructions may be stored using any suitable article(s) of manufacture that include one or more tangible, computer-readable media to at least collectively store the instructions. The article(s) of manufacture may include, for example, the memory 18 and/or the nonvolatile storage 20. The memory 18 and the nonvolatile storage 20 may include any suitable articles of manufacture for storing data and executable instructions, such as random-access memory, read-only memory, rewritable flash memory, hard drives, and optical discs. In addition, the memory 18 may include one or more frame buffers for buffering or caching image data, including unprocessed (e.g., original) and processed (e.g., altered) image data.

The network device 24 may provide network connectivity to a personal area network (PAN) (e.g., a Bluetooth network), a local area network (LAN) (e.g., an 802.11x Wi-Fi network), and/or a wide area network (WAN) (e.g., a 3G or 4G cellular network). In certain embodiments, the network device 24 may provide for a connection to an online digital media content provider, such as the iTunes® service available from Apple Inc. Through such a service, a user may access, stream, or download digital video to the electronic device 10, which may then be played back and processed by image processing logic 30 in accordance with one or more of the image alteration techniques disclosed herein.

The display 28 may display various image data, including stored image data (e.g., picture or video files stored in the nonvolatile storage 20), streamed image data (e.g., from the network device 24), as well as live captured image data (e.g., via imaging subsystem 34). Additionally, the display 28 may display various images generated by the electronic device 10, including a GUI for an operating system or other application. The display 28 may be any suitable display such as a liquid crystal display (LCD), plasma display, or an organic light emitting diode (OLED) display, for example. In one embodiment, display 28 may be provided in conjunction with a touch screen that may function as part of a control interface for the electronic device 10.

As mentioned above, the electronic device 10 may include certain image processing logic 30, which may be used to alter image data in response to one or more device operation events. As will be discussed below, such device operation events may include audio events (e.g., provided by the audio input device 40), motion events (e.g., provided by the motion sensing device 36), location events (e.g., provided by the positioning device 38), or image capture events (e.g., provided by the imaging subsystem 34), or some combination thereof. Based at least partly on device operation events associated with the image data to be altered, the image processing logic 30 and/or other data processing circuitry may apply a corresponding image alteration effect or effects to image data as it is displayed on display 28. Rather than always apply a full-quality version of an image alteration effect, however, the electronic device 10 sometimes may apply a reduced-quality version of the image alteration effect.

The various components 34, 36, 38, and 40 that may contribute to device operation events in the presently illustrated embodiment will now be described beginning with the imaging subsystem 34. The imaging subsystem 34 may be configured to capture still or moving images. For instance, the imaging subsystem 34 may include one or more cameras having a plurality of image sensors, as well as an image signal processor (ISP), which may be part of the processor(s) 16. As will be appreciated, the ISP may process data acquired via the image sensors to generate a digital representation of the captured data, which may be displayed and/or stored on the electronic device 10. As will be discussed further below, certain embodiments may provide for image alteration based upon one or more properties of the imaging subsystem 34, such as a detected lighting condition, exposure value, brightness level, sharpness level, or some other type of imaging property.

The motion sensing device 36 may be any device configured to measure motion or acceleration experienced by the electronic device 10, such as an accelerometer or a gyroscope. In one embodiment, the motion sensing device 36 may be a three-axis accelerometer that includes a sensing element and an integrated circuit interface for providing the measured acceleration and/or motion data to the processor(s) 16. The motion sensing device 36 may be configured to sense and measure various types of motion including, but not limited to, velocity, acceleration, rotation, and direction, all of which may be configured to trigger one or more image alteration effects.

The electronic device 10 also may include the positioning device 38. By way of example, the positioning device 38 may be a GPS system, such as an Assisted GPS (A-GPS) system. The positioning device 38 may be configured to determine the geographic coordinates of the electronic device 10. In one embodiment, the image processing logic 30 may determine whether or not to apply a particular image alteration effect based upon the geographic position of the electronic device 10.

Additionally, the electronic device 10 may include the audio input device 40, which may be configured to receive audio signals. In one embodiment, the audio input device 40 may include one or more audio receivers, such as microphones. Based upon certain audio events, which may be the detection of certain properties of a received audio signal, such as a key, tempo, beat, frequency, volume, spectral content, RMS level, etc., the image processing logic 30 may determine whether or not to apply an image alteration effect to an image that is being displayed on the display 28. Further, in addition to analyzing audio signals received by the audio input device 40, audio events that may trigger image alteration could also be determined via analysis of audio data being played on the electronic device 10. For instance, in one embodiment, image alteration may be triggered based on a key, tempo, beat, frequency, volume, spectral content, RMS level, etc., of music data being played on the electronic device 10, which may be a song or an audio portion of a concurrently played video file. In the latter case, the audio portion of the video data may trigger image alteration of the video data as it is being played. Still further, one embodiment may provide for image alteration based upon metadata information, such as genre or artist information corresponding to a music or audio file being played back on the electronic device 10. As can be appreciated, image alteration effects implemented by the image processing logic 30 may include any suitable type of image alteration effect, including, without limitation, the examples listed above, and may be triggered by operation events provided from any of the components 34, 36, 38, or 40 depending on user preference settings.

Figure 2:
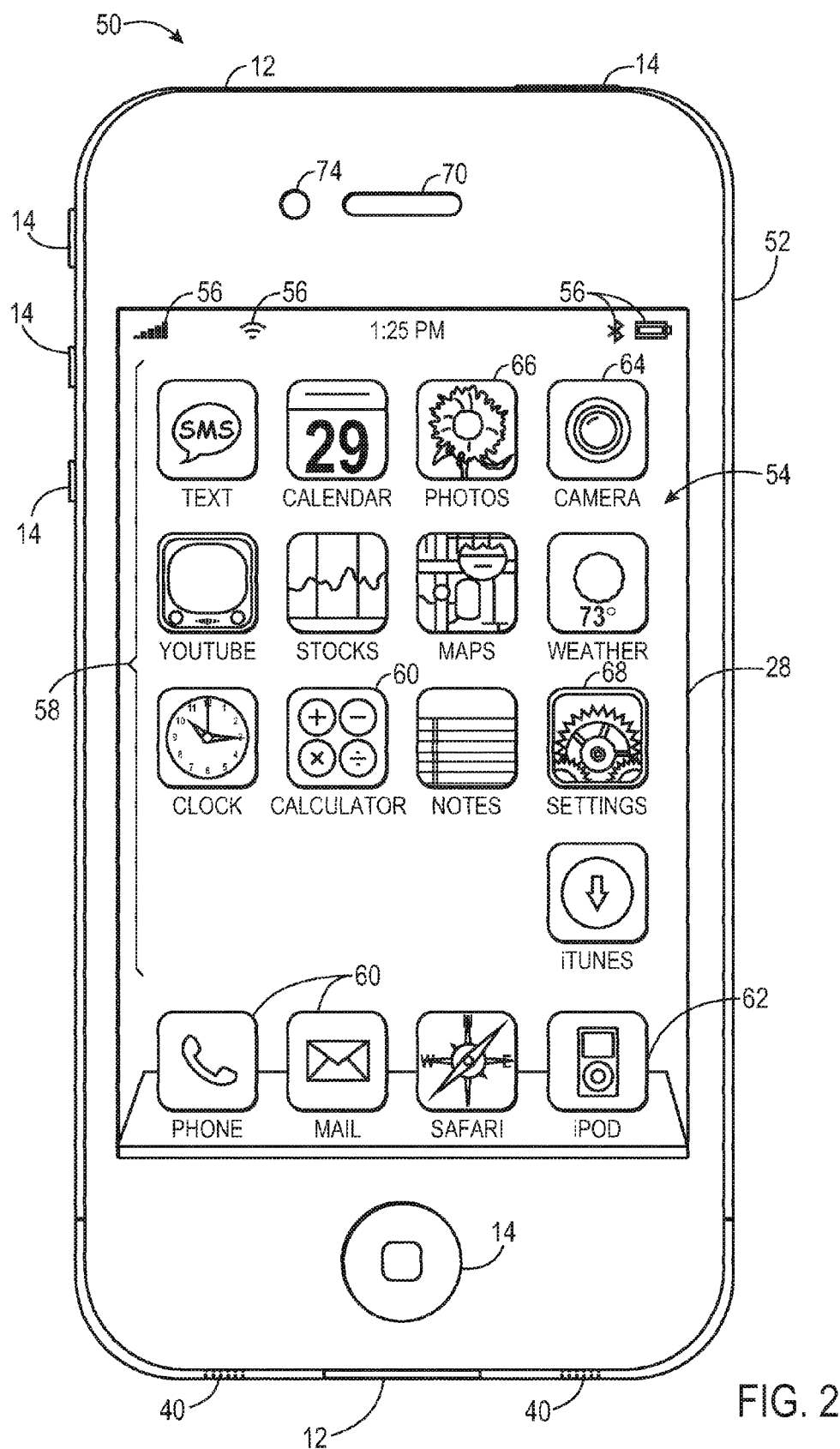
FIG. 2 is a front-facing view showing the electronic device of FIG. 1 in the form of a portable handheld electronic device, in accordance with aspects of the present disclosure.

Referring now to FIG. 2, the electronic device 10 is illustrated in the form of a portable the handheld device 50, which may be a model of an iPod® or iPhone® available from Apple Inc. It should be understood that while the illustrated the handheld device 50 is generally described in the context of portable digital media player and/or cellular phone, additional embodiments of the handheld device 50 may incorporate additional functionalities, such as a camera, a portable gaming platform, a personal data organizer, or some combination thereof.

In the depicted embodiment, the handheld device 50 includes an enclosure 52, which may function to protect the interior components from physical damage and shield them from electromagnetic interference. The enclosure 52 may be formed from any suitable material or combination of materials, such as plastic, metal, or a composite material. As shown in the present embodiment, the enclosure 52 includes several user input structures 14, through which a user may interface with the handheld device 50. By way of example, one or more of input structures 14 may be configured to invoke a "home" screen 54 or menu to be displayed, to toggle between a sleep, wake, or powered on/off mode, to silence a ringer for a cellular phone application, to increase or decrease a volume output, and so forth. It should be understood that the illustrated input structures 14 are merely exemplary, and that the handheld device 50 may include any number of suitable user input structures existing in various forms including buttons, switches, keys, knobs, scroll wheels, and so forth.

In the illustrated embodiment, the display 28 may be provided in the form of a liquid crystal display (LCD), which may display various images generated by the handheld device 50. For example, the display 28 may display various system indicators 56 providing feedback to a user with regard to one or more states of the handheld device 50, such as power status, signal strength, external device connections, and so forth. The display 28 may also display a graphical user interface ("GUI") 58 to allow a user to interact with the handheld device 50. The GUI 58 may include various layers, windows, screens, templates, or other graphical elements that may be displayed in all, or a portion, of the display 28. For instance, as shown on the home screen 54, the GUI 58 may include graphical elements representing applications and functions of the handheld device 50.

The graphical elements may include icons 60, each of which may correspond to various applications that may be opened or executed upon detecting a user selection of a respective icon 60. By way of example, one of the icons 60 may represent a media player application 62, which may provide for the playback of digital audio and video data stored on the handheld device 50, as well as the playback of streamed video data. Another icon 60 may represent a camera application 64, which may provide for the capture of still or moving images by a camera which, in one embodiment, may be integrated with the handheld device 50. Additionally, one of the icons 60 may also represent a photo browser application 66, by which a user may view images stored on the handheld device 50, some of which may have been acquired using the camera application 64. Further, one of the icons 60 may represent an application 68 through which a user may set various user preferences for controlling the alteration of image data based upon device operation events. In some embodiments, the selection of an icon 60 may lead to a hierarchical navigation process, such that selection of an icon 60 leads to a screen that includes one or more additional icons or other GUI elements. As will be appreciated, the icons 60 may be selected via a touch screen included in the display 28, or may be selected using one of the user input structures 14.

As shown, the handheld device 50 may include audio input devices 40, which may be provided as one or more microphones. In some embodiments, the audio input devices 40 may also be integrated with audio output devices, such as speakers, for transmitting audio signals to a user, such as during playback of music data, for example. Further, where the handheld device 50 includes a cell phone application, an additional audio output transmitter 70 may be provided, as shown in FIG. 2. The output transmitter 70 may also include one or more speakers configured to transmit audio signals to a user, such as voice data received during a telephone call. Thus, the audio input devices 40 and the output transmitter 70 may operate in conjunction to function as the audio receiving and transmitting elements of a telephone.

Figure 3:
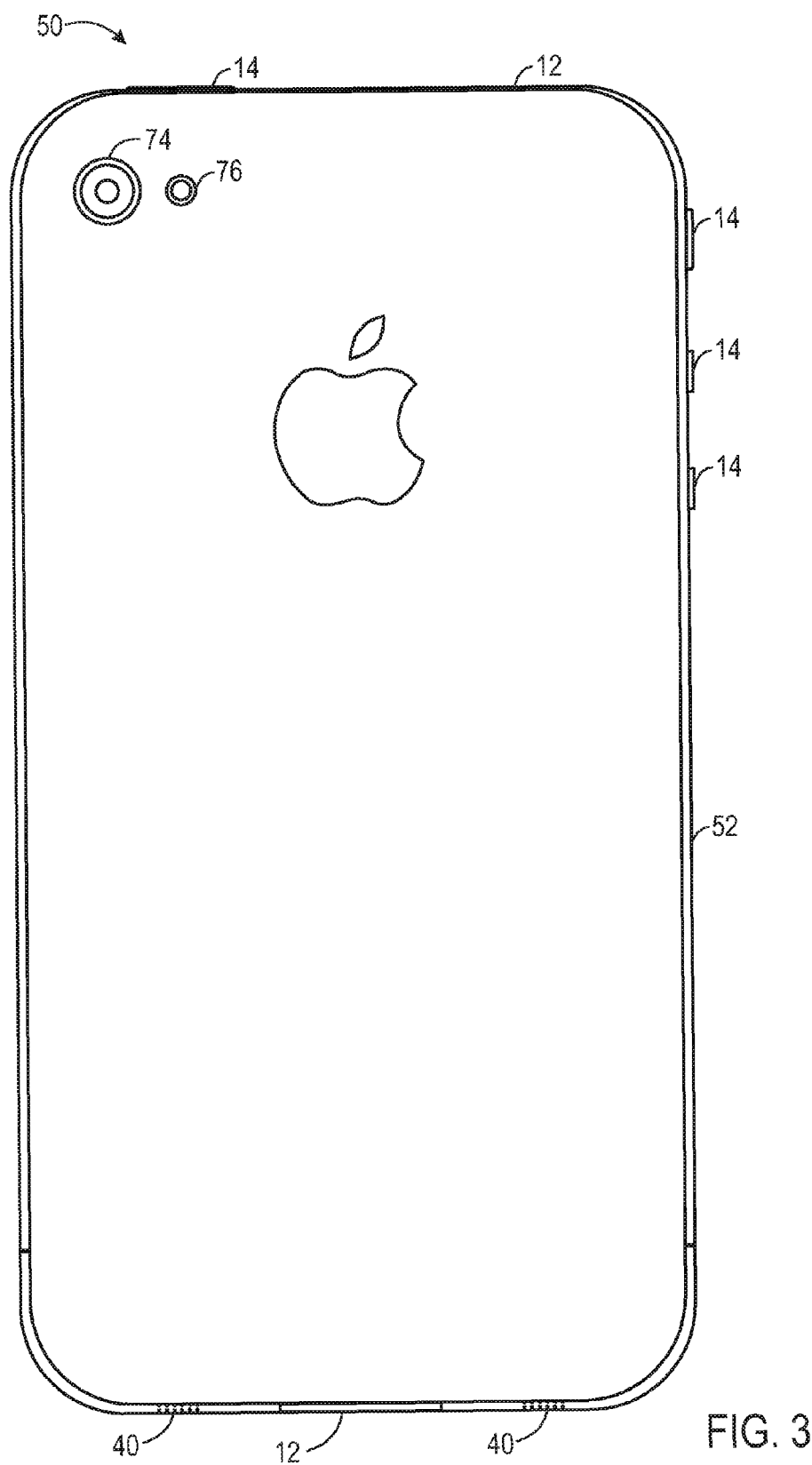
FIG. 3 is a back-facing view of the electronic device shown in FIG. 2.

Referring briefly to FIG. 3, a rear view of the handheld device 50 is illustrated. As shown in FIG. 3, the electronic the handheld device 50 may include a camera 74, which may be used in conjunction with the camera application 64 to acquire still or moving images, such as digital photographs or movies, with or without a light source 76. Such a light source 76 may include, for example, a light emitting diode (LED) or a xenon flash. As will be discussed in further detail below, images acquired via the camera 74 may be stored on the handheld device 50, and may be subsequently processed by the image processing logic 30 for the addition of one or more image alteration effects. Additionally, various device operation events that take place while such images are captured may be stored in association with the captured images. These device operation events may be used in the automatic application of an image alteration effect to the associated image data at a later time. In some embodiments, the image processing logic 30 may apply either a full-quality version or a reduced-quality version of an image alteration effect in real time during image capture, depending on the currently available device processing resources.

Figure 4:
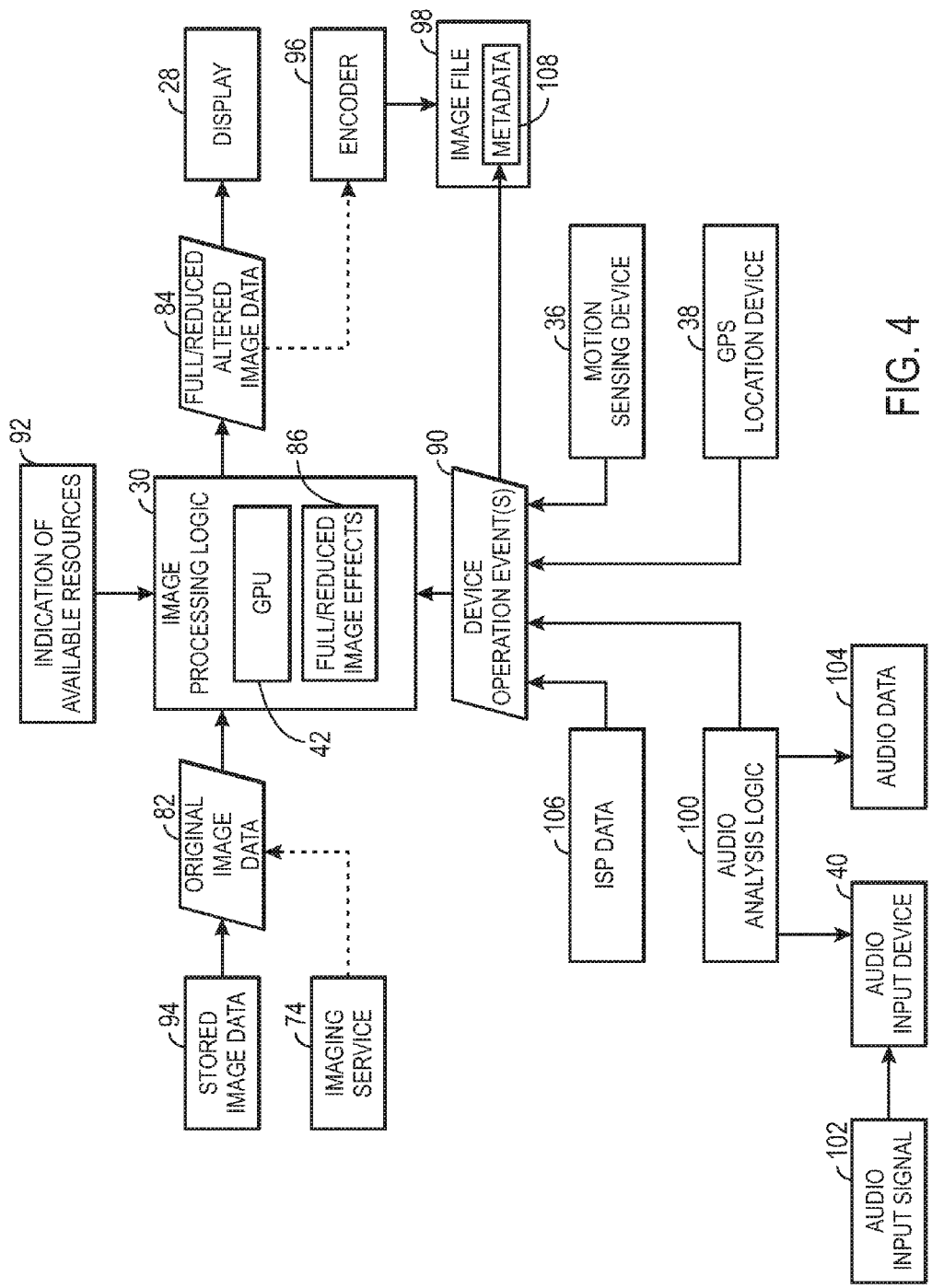
FIG. 4 is a schematic block diagram depicting a technique for altering image data in response to various events that may be detected during operation of the electronic device of FIG. 1, in accordance with aspects of the present disclosure.

Continuing to FIG. 4, a schematic block diagram showing a process by which image data is altered by image processing logic 30 in response to one or more device operation events on the electronic device 10 is illustrated, in accordance with aspects of the present technique. As shown in the illustrated embodiment, input image data, referred to as "original image data" 82, may be captured live (e.g., in substantially real time) using the camera 74, or may be played back or viewed from an image file 94 stored on the electronic device 10. In a further embodiment, the original image data 82 may be streamed over a network, such as the Internet, in the context of a video conferencing application, such as iChat® or FaceTime® (available from Apple Inc.). In processing the original image data 82, the image processing logic 30, which may operate in cooperation with the GPU 42, may apply one or more image alteration effects 86 to original image data 82 to produce altered image data 84. Such image alteration effects 86 may be applied in response to the occurrence of one or more device operation events 90.

The association of specific triggering device operation events 90 to corresponding image alteration effects 86 may be configured as "image alteration rules," as discussed further by U.S. patent application Ser. No. 12/541,597, "IMAGE ALTERATION TECHNIQUES," assigned to Apple Inc., which as noted above is incorporated herein by reference in its entirety. In addition, while the GPU 42 is shown in FIG. 4 as being integrated with the image processing logic 30, it should be understood that the image processing logic 30 and the GPU 42 could also be separate components in other embodiments (e.g., FIG. 1).

Since certain image alteration effects may be particularly resource-intensive, the image processing logic 30 and/or other data processing circuitry may not always apply a full-quality version image alteration effect 86. Indeed, in some embodiments, depending on an indication of currently available device processing resources 92, the image processing logic 30 and/or the other data processing circuitry may apply a reduced-quality version of an image alteration effect 86 instead. Such an indication of currently available device processing resources 92 may represent, for example, an amount of available memory 18, a current usage of the processor(s) 16, performance counters, and so forth. As noted below, in certain embodiments, the image processing logic 30 and/or other data processing circuitry may vary between applying the full-quality version of the image alteration effect 86 and the reduced-quality version of the image alteration effect 86 in real time depending on the indication of currently available device processing resources 92. Specifically, in some embodiments, the image processing logic 30 and/or other data processing circuitry may apply the full-quality version when the indication of available device processing resources 92 exceeds a threshold, and may apply a reduced-quality version at other times.

As shown, the altered image data 84 (resulting from either the full- or reduced-quality version of an image alteration effect 86) may be output to the display 28 for viewing on the electronic device 10. In some embodiments, the altered image data 84 may also be stored on the electronic device 10 as an image file 98. For instance, the altered image data 84, which may include still pictures or video data, may be encoded into one or more suitable image formats using an encoder 96. By way of example, where the altered image data 84 includes video data, the image file 98 may be encoded using a codec into a variety of image file formats, including those based upon H.264, MPEG-4, or 3GP multimedia formats. In one embodiment, the image file 98 may be a stored as a QuickTime® file for later playback on the electronic device 10 using the QuickTime® Player application, available from Apple Inc. It should be appreciated that any type of suitable video or picture formats may be utilized by the encoder 96 for creating the image file 98 for storage (e.g., in the nonvolatile storage 20) on the electronic device 10. In certain embodiments, the device operations events 90 that shaped the application of the image alteration effect(s) 86 in the altered image data 84 may be associated with the image file 98 (e.g., stored as metadata 108 or stored in a database linked to the image file 98).

As discussed above, these device operation events 90 that may contribute to the triggering of image alteration effects 86 may include audio, motion, location, or image capture events, among other things. In certain embodiments, as discussed below, certain processing for determining the device operation events 90 may be performed as full- or reduced-quality versions, in which reduced-quality versions may be analyses that are less detailed than full-quality versions. Additionally or alternatively, this device operation event 90 processing may take place in another electronic device 10 (e.g., an electronic device 10 having greater device processing resources), as discussed in greater detail below.

When such device operation events 90 are determined in the electronic device 10, the electronic device 10 may include audio analysis logic 100. The audio analysis logic 100 may be configured to analyze audio signals 102 received by the audio input device 40, which may be a microphone in one embodiment. Thus, the audio signals 102 received by the audio input device 40 may include a user's voice, as well as voice and/or music from external audio sources. Additionally, the audio analysis logic 100 may also be configured to analyze the playback of audio data 104 on the electronic device 10. The audio data 104 may be, for instance, an audio file being concurrently played with the original image data 82, such as the audio portion of a movie or music video. Accordingly, both audio input signals 102 and audio data 104 may be analyzed by logic 100 for the determination of various audio properties, such as key, tempo, beat, frequency, volume, spectral content, or RMS level properties, as well as properties based upon metadata information, such as genre or artist information. In some embodiments in which the audio data 104 is a radio broadcast, metadata information may be determined by analyzing a metadata sub-carrier associated with the broadcast, such as an RDS data signal associated with an FM broadcast. Based upon the determined audio property or properties, the image processing logic 30 may determine whether an image alteration effect 86 is to be applied to the original image data 82 (e.g., in accordance with an image alteration rule employed by the image processing logic 30).

The electronic device 10 may also include an image signal processor (ISP) 106, which may operate in cooperation with the camera 74 as components of the imaging subsystem 34. The ISP 106 may process data received from image sensors of the camera 74 to generate a digital image representing the data captured by the image sensors. In accordance with the presently described image alteration techniques, certain image capture properties, such as lighting conditions, sharpness, brightness levels, or exposure values, may be determined by ISP 106 and provided to image processing logic as the device operation events 90, which may be used to trigger the alteration of the original image data 82. Additionally, as discussed above, the electronic device 10 may include the motion sensing device 36 and the positioning device 38 to provide motion and location data, respectively, to the image processing logic 30. Under such conditions, the image processing logic 30 may perform image alteration if the motion or location data corresponds to an operation event that triggers image alteration. To summarize, the image processing logic 30 may apply one or more image alteration effects 86 to the original image data 82 based at least partly on the occurrence of certain triggering device operation events 90, which may include audio events, motion events, location events, or image capture events, or some combination thereof.

Figure 5:
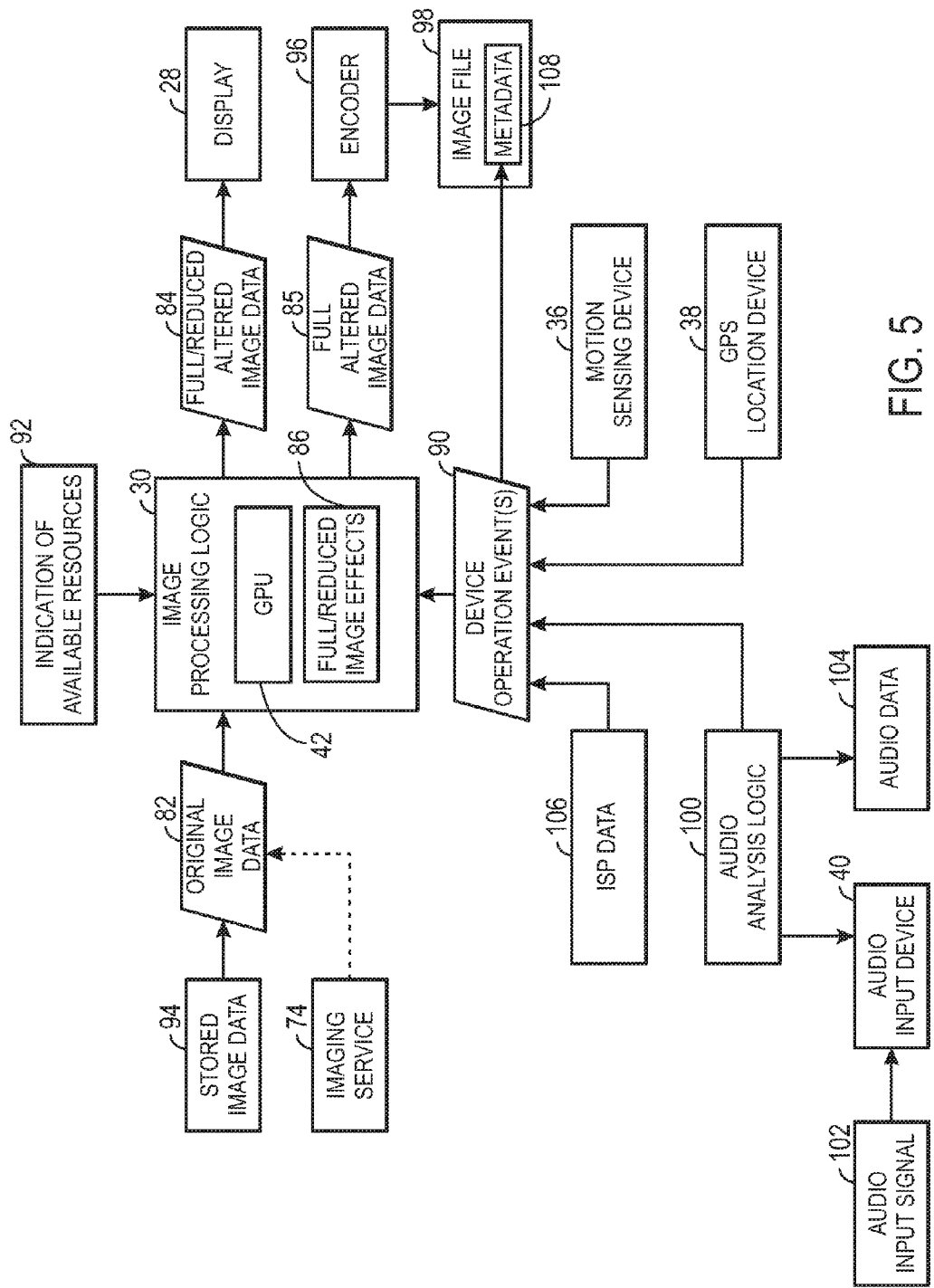
FIG. 5 is a schematic block diagram depicting another technique for altering image data in response to various events that may be detected during operation of the electronic device of FIG. 1, in accordance with aspects of the present disclosure.

In the embodiment of FIG. 4, the altered image data 84 displayed on the display 28 may vary between representing full-quality versions of the image alteration effect(s) 86 and reduced-quality versions of the image alteration effect(s) 86. When such altered image data 84 is encoded by the encoder 96 to produce the image file 98, the resulting image file 98 may likewise represent altered image data 84 that varies between representing full-quality versions of the image alteration effect(s) 86 and reduced-quality versions of the image alteration effect(s) 86. In the embodiment of FIG. 5, while the altered image data 84 displayed on the display 28 may vary between representing full-quality versions of the image alteration effect(s) 86 and reduced-quality versions of the image alteration effect(s) 86, the altered image data 84 may not be encoded to produce an image file 98. Rather, at a time when sufficient resources become available, the image processing logic 30 and/or other data processing circuitry may apply the full-quality version of the image alteration effect(s) 86 to the original image data 82 to produce full altered image data 85. This full altered image data 85 may be encoded by the encoder 96 to produce an image file 98. In this way, a user may view the application of an image alteration effect 86 in real time on the display 28 via the altered image data 84, which may appear as a full- or reduced-quality version depending on the current indication of available device processing resources 92. However, the user may also obtain an image file 98 for which the full-quality version of the image alteration effect 86 has been applied.

Figure 6:
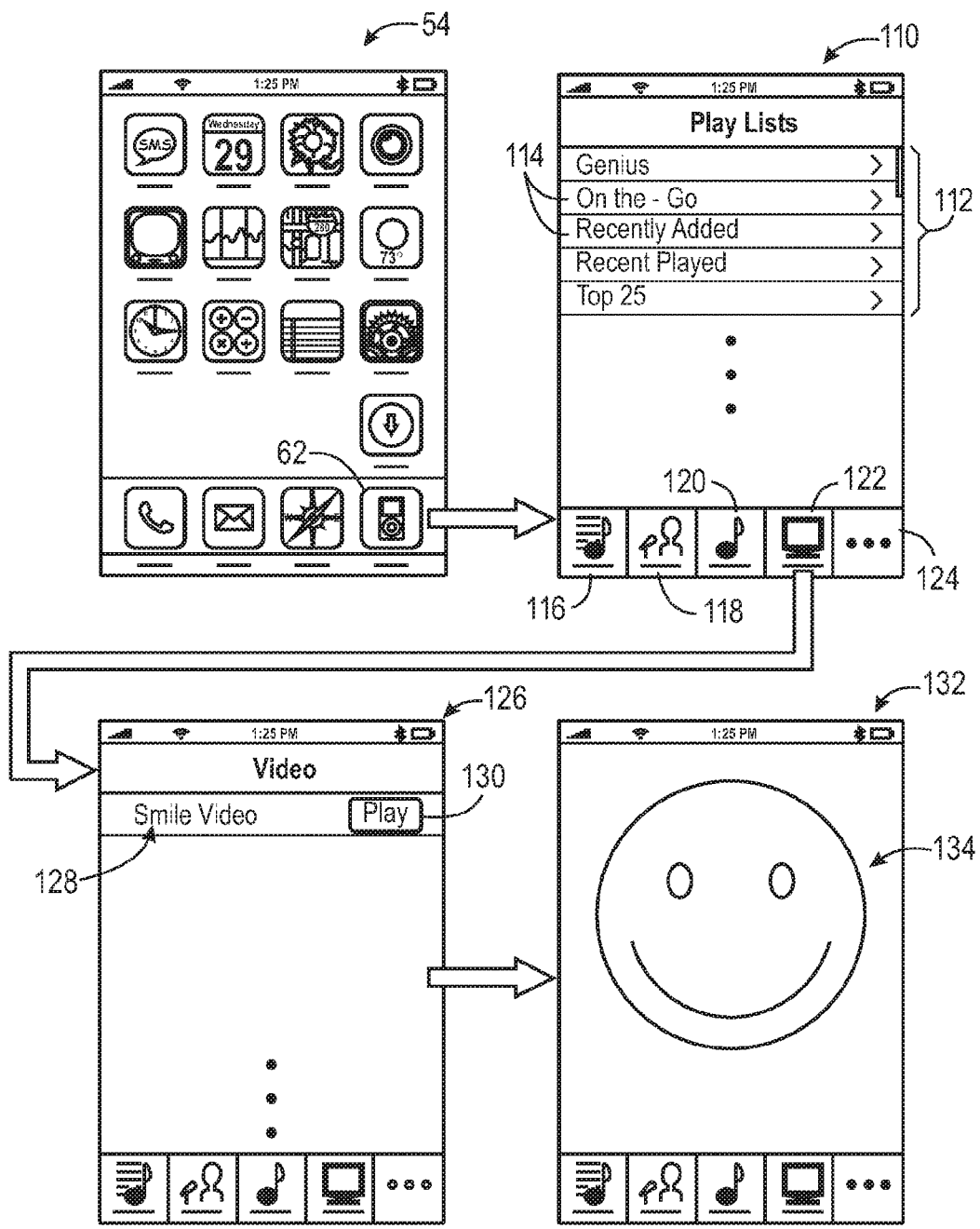
FIG. 6 is a series of screens that may be displayed on the electronic device of FIG. 2 for video playback, in accordance with aspects of the present disclosure.
Figure 7:
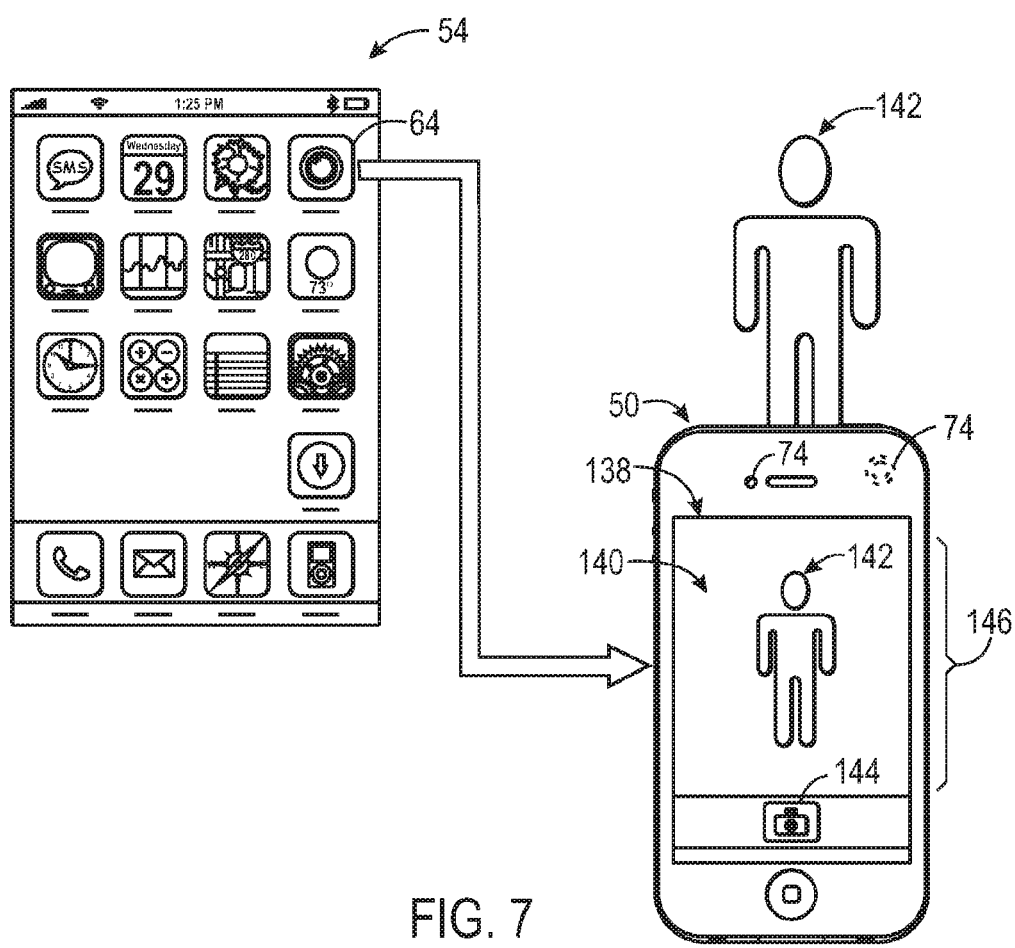
FIG. 7 is a series of screens that may be displayed on the electronic device of FIG. 2 for acquiring live image data, in accordance with aspects of the present disclosure.
Figure 8:
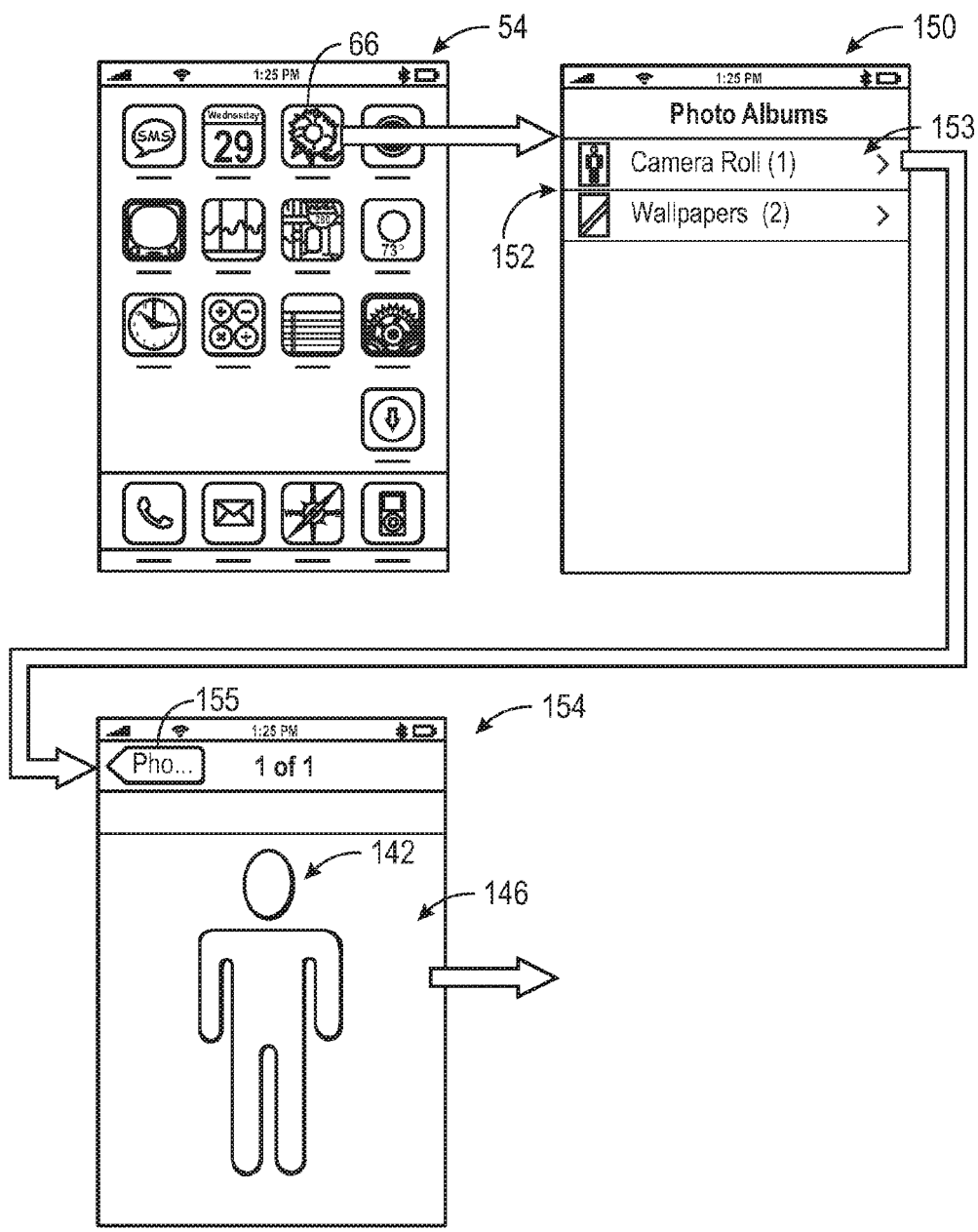
FIG. 8 is a series of screens that may be displayed on the electronic device of FIG. 2 for viewing images stored on the device of FIG. 2, in accordance with aspects of the present disclosure.

With the above points in mind, various techniques for acquiring, viewing, or playing back still and moving image data using the handheld device 50 are illustrated in FIGS. 6-8 by way of a plurality of screen images that may be displayed on the display 28. Particularly, FIG. 6 depicts the playback of a video file using the media player application 62, FIG. 7 depicts the live capture of image data using the camera 74 and the camera application 64, and FIG. 8 depicts the viewing of image data stored on the handheld device 50 using the photo browser application 66, all in accordance with aspects of the present disclosure. As should be understood, the depicted screen images in FIGS. 6-8 may be generated by the GUI 58 and displayed on the display 28 of the handheld device 50. For instance, these screen images may be generated as the user interacts with the handheld device 50, such as via input structures 14, or by way of a touch screen interface.

It should also be understood that the GUI 58, depending on the inputs and selections made by a user, may display various screens including icons (e.g., 60) and graphical elements. These elements may represent graphical and virtual elements or "buttons" which may be selected by the user from the display 28. Accordingly, it should be understood that the term "button," "virtual button," "graphical button," "graphical elements," or the like, as used in the following description of screen images below, is meant to refer to the graphical representations of buttons or icons represented by the graphical elements provided on the display 28. Further, it should also be understood that the functionalities set forth and described in the subsequent figures may be achieved using a wide variety graphical elements and visual schemes. Therefore, the illustrated embodiments are not intended to be limited to the precise user interface conventions depicted herein. Rather, additional embodiments may include a wide variety of user interface styles.

As initially shown in FIG. 6, beginning from home screen 54 of GUI 58, the user may initiate the media player application 62 by selecting the graphical button indicated by numeral 62. By way of example, the media player application 62 may be an iPod® application running on a model of an iPod Touch® or an iPhone®, available from Apple Inc. Upon selection of graphical button associated with the media player application 62, the user may be navigated to a home screen 110 of the media player application 62. As shown in FIG. 5, the screen 110 may initially display a listing 112 showing various playlists 114 stored on the electronic device 10. The screen 110 also includes graphical buttons 116, 118, 120, 122, and 124, each of which may correspond to specific functions. For example, if the user navigates away from the screen 110, the selection of the graphical button 116 may return the user to the screen 110 and display the playlists 114. The graphical button 118 may organize the media files stored on the handheld device 50 and display the media files in groupings based upon artist names, whereas the graphical button 120 may represent a function by which media files are sorted and displayed alphabetically in a listing that may be navigated by the user. Additionally, the graphical button 122 may present the user with a listing of video files available for playback on the handheld device 50. Finally, the graphical button 122 may provide the user with a listing of additional options that the user may configure to further customize the functionality of the handheld device 50 and/or the media player application 62.

As shown, the selection of the graphical button 122 may advance the user to a screen 126, which may display a listing of video files available for playback on the handheld device 50. By way of example, video files stored on the handheld device 50 may include music videos, captured videos (e.g., using the camera 74), or movies. In some embodiments, video files may be downloaded from an online digital media service, such as iTunes®. As illustrated in the screen 126, a video file 128 is stored on the handheld device 50 and may be played by selecting a graphical button 130. For instance, upon selection of the graphical button 130, the video file 128 may be played back on the screen 132, which may sequentially display video images 134 corresponding to the video file 128.

FIG. 7 shows screen images depicting the live capture of image data using the camera 74. Returning to the home screen 54, a user may initiate a camera application by selecting a graphical button associated with the camera application 64. The initiation of the camera application 64 may activate image sensors within the camera 74 for acquisition of image data, as well as the ISP 106 for processing the image data captured via the image sensors. As shown, selection of icon associated with the camera application 64 may cause a screen 138 to be displayed on the handheld device 50. The screen 138 may include a viewfinder 140, which may display image data captured by the camera 74 in substantially real time. For instance, if the user wishes to capture an image of a subject 142, the user may position the handheld device 50 in such a manner that an image of the subject 142 appears in the viewfinder 140. As will be discussed in greater detail below with reference to FIG. 15, in certain embodiments, while the camera application 64 is capturing image data, certain device operation events 90 happening concurrently with such image capture may be stored as metadata for use at a later time.

The screen 130 also may include a graphical button 144, which may be selected to store the captured images shown in the viewfinder 140. The stored image data, referred to here by reference number 146, may include still images, such as pictures, as well as moving images, such as video. The stored image data 146 (which may be analogous to the stored image data 94 of FIG. 4), may be viewed or played back on the handheld device 50 at a later time. The device operation events 90 that occurred while the stored image data 146 was originally captured may or may not be associated with the stored image data 146.

FIG. 8 shows screen images depicting how a user may view images stored on the handheld device 50 using the photo browser application 66. For instance, beginning at the home screen 54, a user may select an icon associated with the photo browser application 66 to run a photo browser application. By way of example, photo browser application 66 may be a version of iPhoto®, available from Apple Inc., or a mobile photo browser application, which may be found on models of the iPod® Touch or the iPhone®, also available from Apple Inc. As shown in FIG. 8, the selection of the icon associated with the photo browser application 66 may advance the user to a home screen 150 of the photo browser application 66. The screen 150 may display a listing 152 of "albums" or groupings of images stored on the handheld device 50. By selecting an album 153, the user may be advanced to a screen 154, on which the image 146 (showing the subject 142) that was previously acquired using the camera application 64 (FIG. 7) is displayed. In embodiments where an album includes multiple images, the multiple images may be sequentially displayed in the form of a slideshow. The screen 154 also includes a graphical button 155, which the user may select to return to the listing 152 on the screen 150.

Having described several techniques in FIGS. 6-8 by which image data may be acquired, viewed, or played back on the handheld device 50, FIGS. 9-13 are intended to illustrate various examples of image alteration effects 86 that may be applied to images displayed on the handheld device 50 in response to various types of device operation events 90, in accordance with aspects of the present disclosure. Before continuing, it should be understood the present disclosure is not intended to be limited to the specific image alteration examples depicted in FIGS. 9-13. Rather, these examples are intended to provide a better understanding of the disclosed image alteration techniques, which may, in additional embodiments, utilize a number of image alteration effects not specifically discussed herein.

Figure 9:
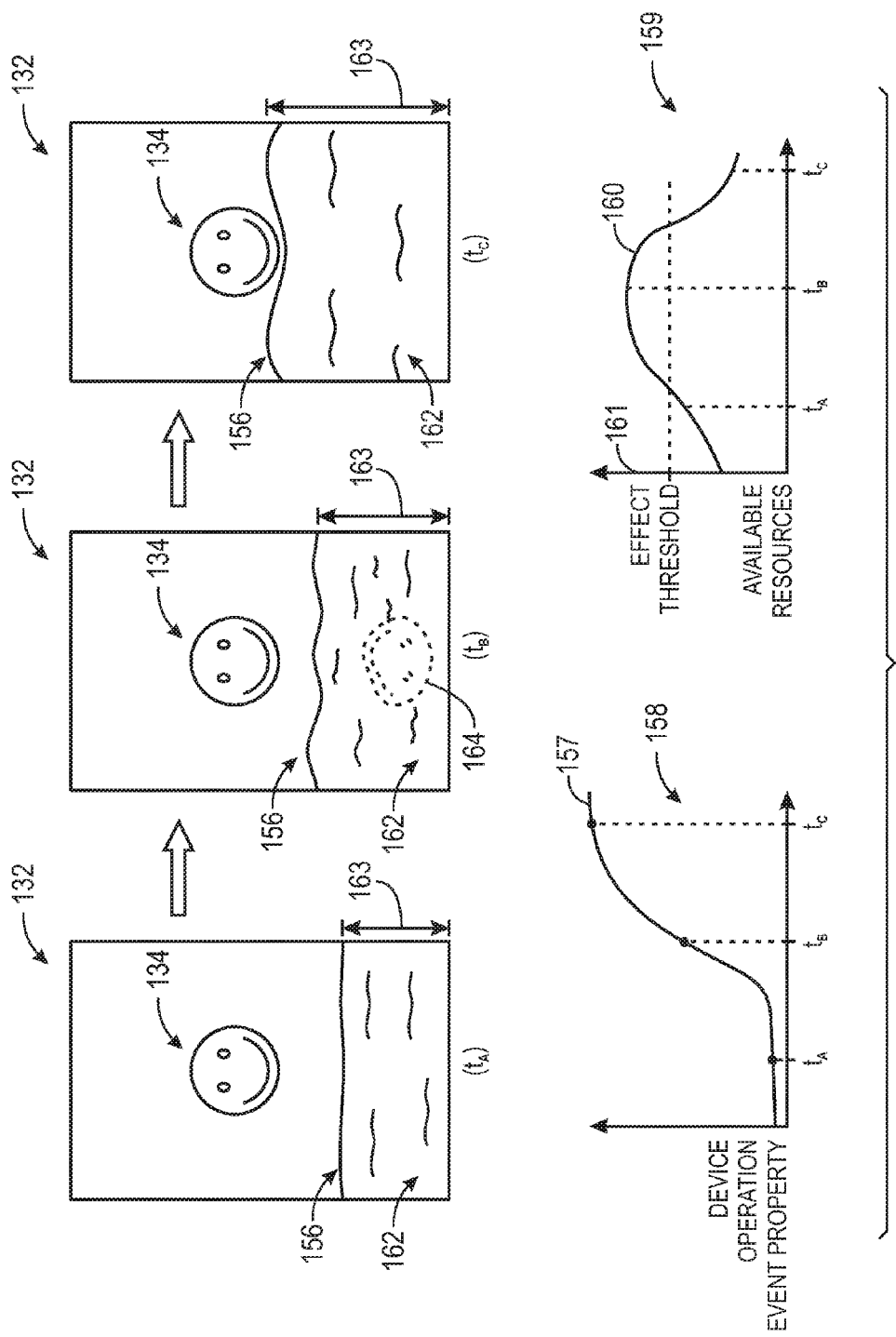
FIG. 9 illustrates an embodiment of a water ripple image alteration technique, in accordance with aspects of the present disclosure.
Figure 10:
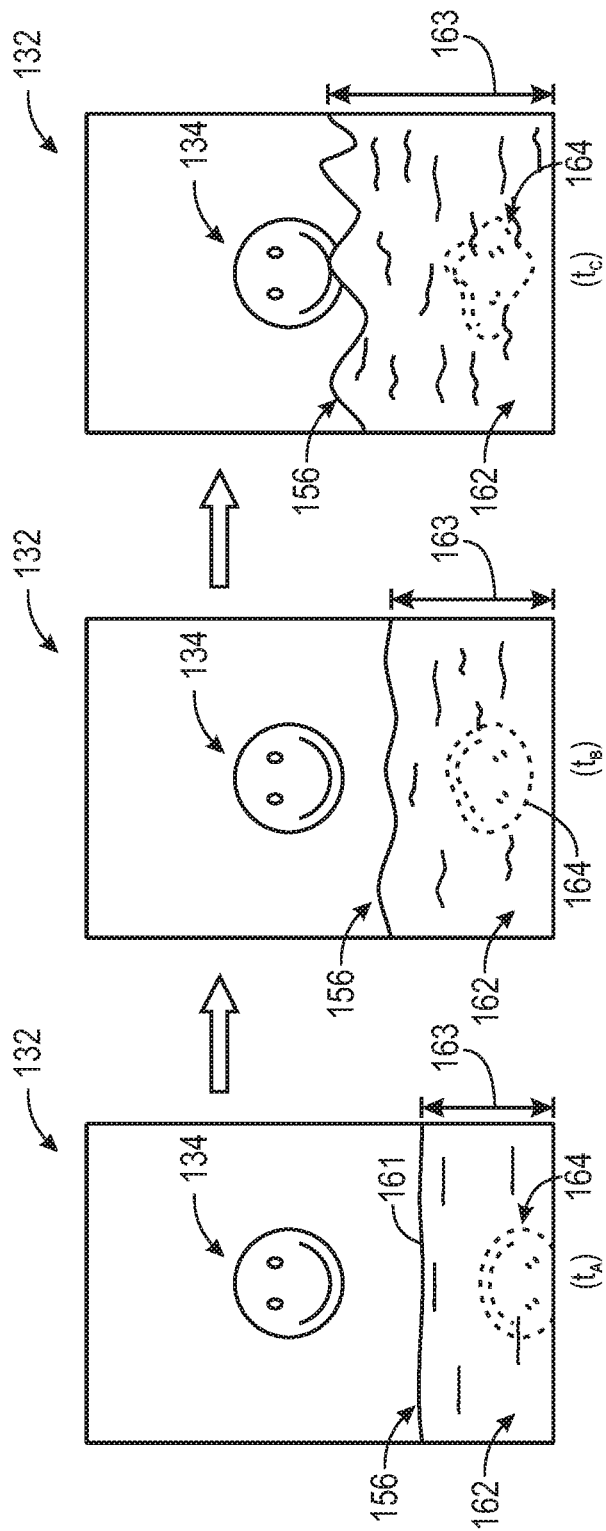
FIG. 10 illustrates altered image data stored in an image file resulting from the image alteration technique of FIG. 9, in accordance with aspects of the present disclosure.

With the foregoing points in mind, FIGS. 9 and 10 show examples of the application of a "water ripple" or "water reflection" image alteration effect 86. Among other things, such an image alteration effect 86 may be triggered based upon audio events. For example, FIG. 9 illustrates the real-time application of a full-quality version and a reduced-quality version of a "water reflection" effect to the video file 128 (FIG. 6) depending on the indication of currently available device processing resources 92 (FIGS. 4 and 5). As discussed above with reference to FIG. 6, the video file 128 may be played back using the media player application 62, in which the video images 134 are displayed on the screen 132.

In the presently illustrated embodiment, the water reflection effect, referred to by reference number 156, may be triggered or influenced by any suitable device operation event 90 property. Such a device operation event 90 property may include audio event properties, such as the detection of changes in a particular audio property over time. Such a change in a device operation event 90 property is illustrated on a curve 157 on a graph 158. As discussed above, device operation event 90 data, such as audio event data, may be determined by analyzing audio input data (via the audio analysis logic 100) to determine one or more properties of the audio input data, such as key, tempo, beat, frequency, volume, spectral content, or RMS level properties, as well as properties based upon metadata information, such as genre or artist information. For instance, the audio data may be an audio signal (e.g., voice input) received by the audio input device(s) 40, or may be audio data played back on the handheld device 50 substantially concurrently with the video file 128. By way of example, where the video file 128 is a music video file, the analyzed audio data may be the audio portion of the music video that is played back in synchronization with the video portion of the music video.

Since the currently available device processing resources also may be changing over time, whether to apply a full-quality version of the water ripple effect 156 or a reduced-quality version of the water ripple effect 156 may depend upon the indication of currently available device processing resources 92 (FIGS. 4 and 5). In particular, as shown by a plot 159 modeling the currently available device processing resources over time (trace line 160), the currently available device processing resources 160 may occasionally be above an effect threshold 161 and occasionally be above the effect threshold 161. Such a threshold 161 may define when the handheld device 50 has the processing resources to perform the full-quality version of the water ripple effect 156.

As shown, the water ripple effect 156 may alter the video image 134 by the addition (e.g., overlaying) of a water-like graphical element 162 near the bottom of the screen 132. In the depicted embodiment, the height 163 and overall "turbulence" characteristic of the water-like graphical element 162 may change in response to changes in the device operation event 90 property 157. For instance, as shown on the graph 158, from time $t_A$ to time $t_B$, the value of device operation event 90 property 157 has increased. By way of example, the increase in the device operation event 90 property 157 could correspond to an increase in volume, tempo, frequency level, spectral content, or any suitable type of property that may be used to trigger image alteration. As such, the screen 132 may also change from time $t_A$ to time $t_B$ in response to the change in the device operation event 90 property 157. For instance, as shown in FIG. 9, due to the increase in the device operation event 90 property 157, both the height 163 and turbulence of the water-like graphical element 162 may increase. For instance, as shown on the screen 132 at time $t_B$, the increased turbulence (which may be displayed as "ripples") in the water-like graphical element 162 may cause a reflection 164 to become slightly distorted and the surface of the water-like graphical element 162 to become more wave-like in appearance. As further indicated by the graph 158, the device operation event 90 property 157 continues to increase from time $t_B$ to time $t_C$. Accordingly, as shown by the screen 132 at time $t_C$, the height 163 and turbulence of the water-like graphical element 162 may continue to increase when compared to the screen 132 at time $t_B$.

Whether a full-quality version or a reduced-quality version of the water ripple effect 156 is applied may depend upon when the available device processing resources 160 exceed the threshold 161. In some embodiments, as shown in FIG. 9, the currently available device processing resources may cause the application of either the full-quality version or a reduced-quality version of the water ripple effect 156 substantially in real time. Thus, since the available device processing resources 160 do not exceed the threshold 161 at times $t_A$ and $t_C$, the reduced-quality version of the water ripple effect 156 may appear on the screen 132 at times $t_A$ and $t_C$. Since the available device processing resources 160 do exceed the threshold 161 at time $t_B$, the full-quality version of the water ripple effect 156 may appear on the screen 132 at time $t_B$.

As shown on the screen 132 at time $t_B$, the full-quality version of the water ripple effect 156 may be relatively realistic, imitating the physics of water and including such effects as attenuation and randomization, in addition to wave calculations. In addition, the full-quality version of the water ripple effect 156 may include a reflection 164 of the video images 134 that ripples accordingly. A reduced-quality version of the water ripple effect 156, shown on the screens 132 of times $t_A$ and $t_C$, may represent the same general image alteration effect 86, but may be less complex to consume fewer device processing resources. Thus, for example, the reduced-quality version of the water ripple effect 156 may be less realistic than the full-quality version, including simple sine waves rather than complex water physics. In this way, despite changes in the device processing resources available, the handheld device 50 may be capable of continuing to display the water ripple effect 156, albeit at varying levels of complexity and resource-intensity.

As mentioned above with reference to FIG. 5, although the real-time display of an image alteration effect 86 may vary depending on the currently available device processing resources, the ultimate altered images encoded and saved in the image file 98 may be of the full effect only. Thus, where FIG. 9 may represent an example of real-time application of the water ripple effect 156, in which a full-quality version of the effect is applied only when the currently available device processing resources exceed the threshold 161, FIG. 10 represents the ultimate image file 98 that is generated. In particular, while the real-time application of the water ripple effect 156 may vary between the full-quality version and the reduced-quality version to enable the effect to be shown in real time on the display 28, the full-quality version of the water ripple effect 156 may be applied shortly thereafter. Since the water ripple effect 156 is to be applied for the purpose of generating an image file 98, and not for immediate display on the display 28 of the handheld device 50, the currently available device processing resources may not be a limiting factor. Indeed, the handheld device 50 may take additional time as necessary to apply the full-quality version of the water ripple effect 156 to the images 134 and/or may wait, when sufficient device processing resources are not available, until sufficient device processing resources do become available. As a result, as seen in FIG. 10, the full-quality version of the water ripple effect 156 may be applied at all times (e.g., $t_A$, $t_B$ and $t_C$).

Figure 11:
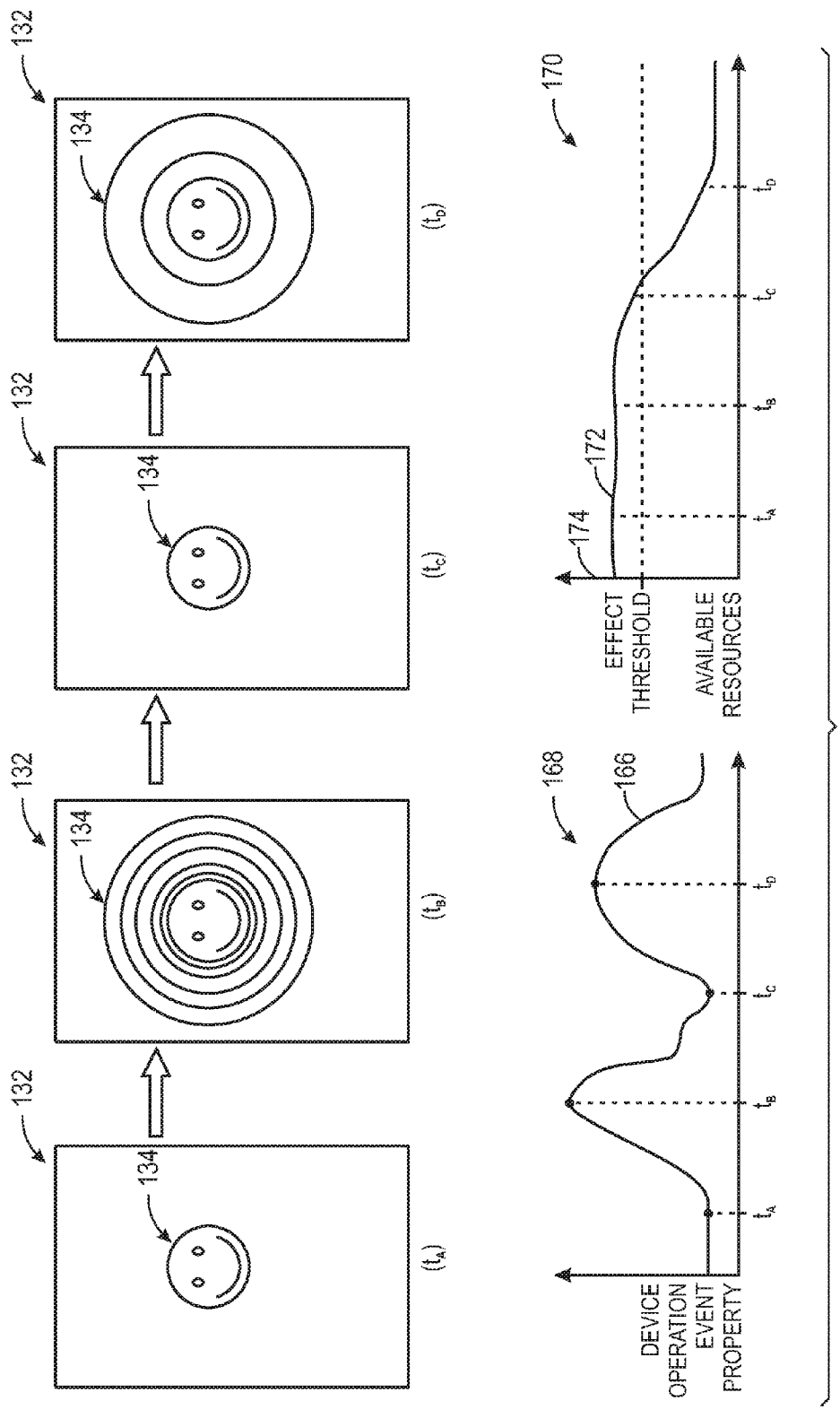
FIG. 11 illustrates an embodiment of a depth-changing image alteration technique, in accordance with aspects of the present disclosure.

Continuing to FIG. 11, another example of an image alteration effect that responds to changes in a particular device operation event 90 property is shown. The image alteration effect shown in FIG. 11 may be a "zooming" effect, in which the depth of the displayed image, which may be video images 134 (corresponding to the video file 128) displayed by the screen 132, changes based on corresponding changes in a device operation event 90 property 166, as illustrated by a graph 168. By way of example only, the device operation event 90 property 166 may indicate the level of a particular frequency range, such as a low frequency level (e.g., bass content), that is present in the audio data being analyzed by the audio processing logic 100.

In addition, since the currently available device processing resources also may be changing over time, whether to apply a full-quality version of the zooming effect or a reduced-quality version of the zooming effect may depend upon the indication of currently available device processing resources 92 (FIGS. 4 and 5). In some embodiments, whether to apply a full-quality version of a determination of the device operation event 90 property (e.g., the level of a certain frequency band) also may depend upon the currently available device processing resources 92. In particular, as shown by a plot 170 modeling the currently available device processing resources over time (trace line 172), the currently available device processing resources 172 may occasionally be above an effect threshold 174 and occasionally be below the effect threshold 174. Such a threshold 174 may define when the handheld device 50 has the processing resources to perform the full-quality version of the zooming effect. The same threshold 174 or a different threshold may define when the handheld device 50 may perform a full-quality version of the determination of the device operation event 90 property. By way of example, a full-quality version of the determination of the device operation event 90 property may be more precise or may be updated more often than a reduced-quality version, but may consume fewer device processing resources.

The zooming effect may be applied such that the depth of a displayed image decreases as the device operation event 90 property 166 (e.g., bass content in the audio data) increases. For instance, referring to the screen 132 at time $t_A$, the video image 134 may be displayed at a first depth based upon the value of the device operation event 90 property 166 at time $t_A$. Subsequently, at time $t_B$, the device operation event 90 property 166 has significantly increased. As such, the screen 132 at time $t_B$ may display video image 134 at a lesser depth, thus creating the visual appearance that video image 134 is "zoomed in." Thereafter, at time $t_C$, the device operation event 90 property 166 may decrease and return to approximately the same level from previous time $t_A$. Thus, as shown by the screen 132 at time $t_C$, the depth of video image 134 may increase ("zoom out") to approximately the same depth that was used in displayed video image 134 at time $t_A$. Finally, at time $t_D$, the device operation event 90 property 166 may increase again, thereby decreasing the depth at which the screen 132 displays video image 134 at time $t_D$, essentially creating the visual effect that video image 134 is "zoomed in" at time $t_D$, although to a lesser extent than at time $t_B$ due to the difference between the device operation event 90 properties 166 at times $t_B$ and $t_D$.

Like the water ripple effect 156 discussed above, whether a full-quality version or a reduced-quality version of the zooming effect is applied may depend upon when the available device processing resources 172 exceed the threshold 174. In some embodiments, as shown in FIG. 11, the currently available device processing resources may cause the application of either the full-quality version or a reduced-quality version of the zooming effect substantially in real time. Thus, since the available device processing resources 172 exceed the threshold 172 at times $t_A$, $t_B$, and $t_C$, the full-quality version of the zooming effect may appear on the screen 132 at times $t_A$, $t_B$, and $t_C$. Since the available device processing resources 172 do not exceed the threshold 174 at time $t_D$, the reduced-quality version of the zooming effect may appear on the screen 132 at time $t_D$.

As shown on the screen 132 at time $t_B$, the full-quality version of the zooming effect 156 may be relatively smooth, involving a "zooming in" on the subject of the video image 134 at a relatively high frame rate (e.g., 10-30 frames per second). In contrast, a reduced-quality version of the zooming effect, shown on the screen 132 of time $t_D$, may represent the same general image alteration effect 86, but may be less complex to consume fewer device processing resources. Thus, for example, the reduced-quality version of the zooming effect may be less smooth than the full-quality version, involving a "zooming in" on the subject of the video image 134 at a relatively lower frame rate (e.g., less than 10-30 frames per second, such as between 1 and 5 frames per second in some embodiments). In this way, despite changes in the device processing resources available, the handheld device 50 may be capable of continuing to display the zooming effect, albeit at varying levels of complexity and resource-intensity.

It should also be understood that, as noted above with reference to FIGS. 5 and 10, while the real-time application of the zooming effect may vary between the full-quality version and the reduced-quality version, the full-quality version of the zooming effect may be applied shortly thereafter to produce an image file 98. For such embodiments, the handheld device 50 may take additional time as necessary to apply the full-quality version of the zooming effect (e.g., not in real time) to the images 134 and/or may wait, when sufficient device processing resources are not available, until sufficient device processing resources do become available. As a result, for the purposes of generating an image file 98 containing the zooming effect, the full-quality version of the zooming effect may be applied to the video images 134 for all times (e.g., $t_A$, $t_B$, $t_C$, and $t_D$).

Figure 12:
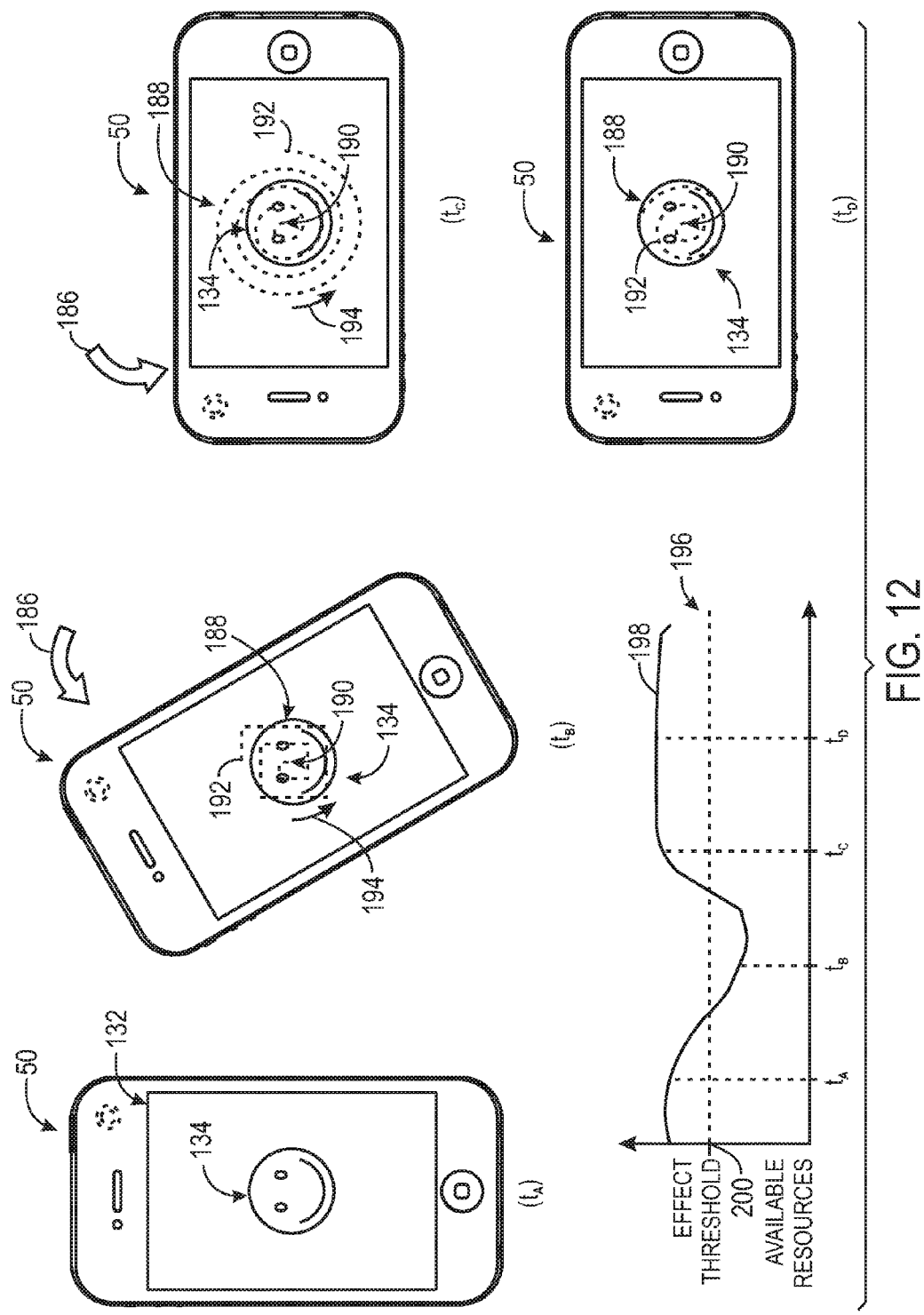
FIG. 12 illustrates an embodiment of a depth-changing image alteration technique, in accordance with aspects of the present disclosure.
Figure 13:
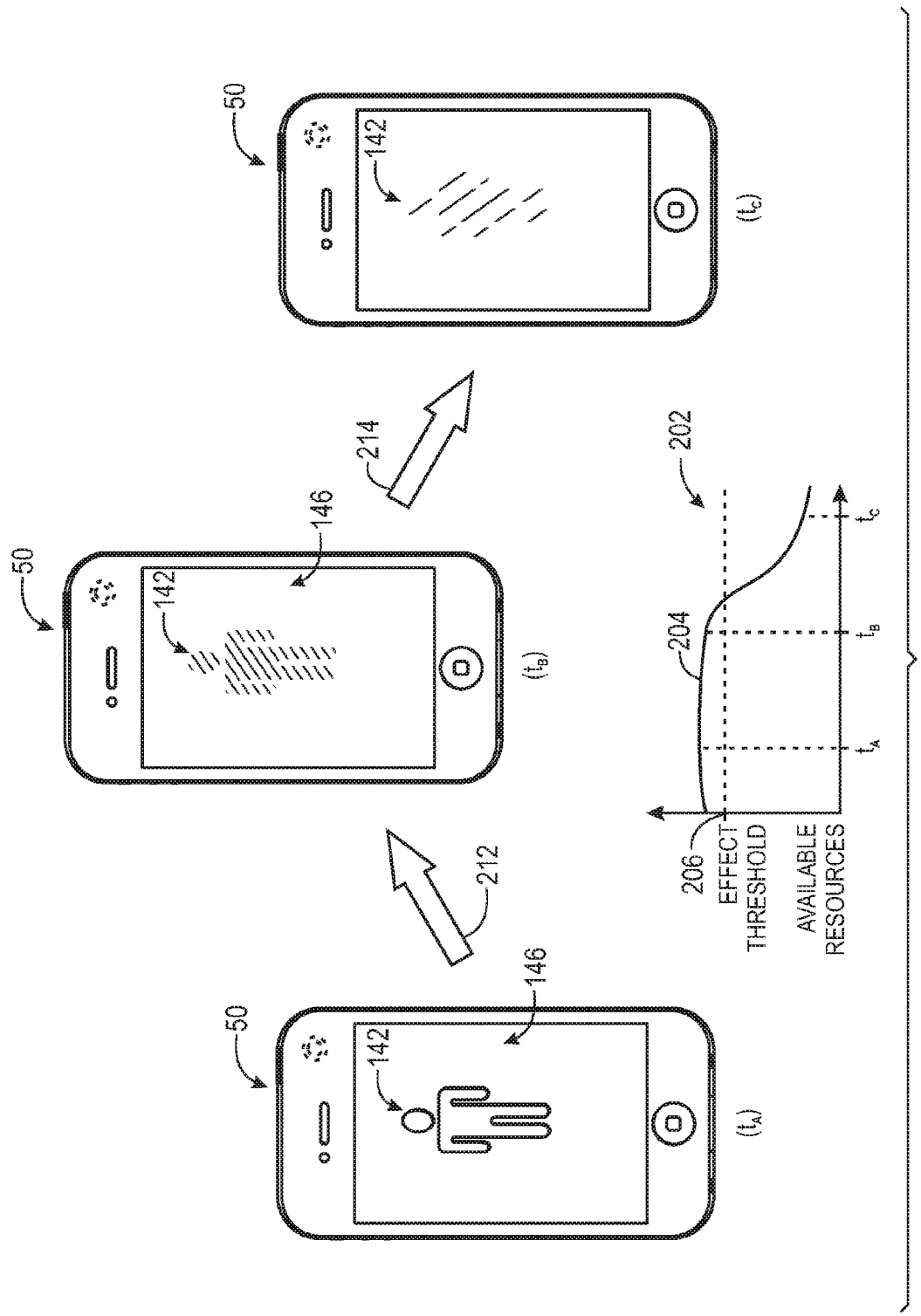
FIG. 13 illustrates an embodiment of a brush-stroke image alteration technique, in accordance with aspects of the present disclosure.

Next, FIGS. 12 and 13 show examples of image alteration effects that may be triggered based upon motion events. For instance, such motion events may be provided by motion data sensed by the motion sensing device 36, which may include an accelerometer and/or gyroscope, configured to sense or measure various types of motion, such as velocity, acceleration, rotation, and direction, all of which may be configured to trigger one or more image alteration effects.

Referring to FIG. 12, an example of an image alteration effect that is triggered by rotational motion of the handheld device 50 is shown at three different points in time: $t_A$, $t_B$, and $t_C$. Initially, the handheld device 50 may be in a first position at time $t_A$. As shown at time $t_A$, the handheld device 50 is in the process of playing back video file 128 and may display video image 134 using the screen 132 of the media player application 62, as previously described in FIG. 5. Between times $t_A$ and $t_B$, the handheld device 50 experiences a rotational motion 186 in the counter-clockwise direction, and is eventually moved into a second position, as shown at time $t_B$.

Based on the rotation 186, the image processing logic 30 may apply a spiral effect, referred to by reference number 188, to video image 134. For instance, the spiral effect 188 may include a curve 192 that emanates from the center 190 of the screen 132 in a direction 194. The direction 194 may be the same direction as the direction of the rotation 186, i.e., counter-clockwise, as shown in the presently illustrated embodiment, or may be opposite the direction of the rotation 186, i.e., clockwise. Additionally, in certain embodiments, the image processing logic 30 may also alter the video image 134 based upon the rotation 186, such that the orientation of the video image 134 remains generally constant from the viewpoint of a user viewing the screen 132, even though the handheld device 50 has changed positions. In other words, despite the movement experienced by the handheld device 50, the video image 134 may appear to remain stationary (though with a spiral effect applied). Also, it should be noted that the present embodiment shows that image alteration may be triggered by any degree of rotation, i.e., triggered by "continuous" rotation. In other embodiments, a triggering rotation event may be defined such that image alteration is not triggered until at least a certain degree of rotation, such as 90 or 180 degrees, is detected.

In some embodiments where image alteration is triggered by continuous rotation, the "intensity" of the image alteration effect may increase and decrease in proportion to the amount of rotational motion experienced by the handheld device 50. That is, some aspect of the image alteration effect may increase or be applied more vigorously as rotation continues, and may decrease or be applied less vigorously when rotation decrease or stops. For instance, as shown in FIG. 12, the handheld device 50 may continue to experience rotation 186 times $t_B$ and $t_C$, eventually reaching a third position at time $t_C$. Based upon this continued rotational motion 186, the "intensity" of the spiral effect 188 may increase, such that the curve 192 emanates even further outward from the center 190 of the screen 132 at time $t_C$. Next, from times $t_C$ to $t_D$, the handheld device 50 may experience little or no motion, thus retaining approximately the same position from times $t_C$ to $t_D$. As shown, because rotational motion was not detected during between times $t_C$ and $t_D$, the "intensity" of the spiral effect 188 may decrease and the curve 192 may retract back toward the center 190 of the screen 132. Further, although not specifically shown in FIG. 12, it should be understood that additional factors, such as the velocity of the rotational motion 186, could also contribute to an increase or decrease in the intensity of an applied image alteration effect.

Like the image alteration effects 86 discussed above, the spiral effect shown in FIG. 12 also may be applied as either a full-quality version or a reduced-quality version depending on the currently available device processing resources. For example, as shown in plot 196 of FIG. 12, when the currently available device processing resources (curve 198) exceed a threshold 200, a reduced-quality version of the spiral effect may be applied. When the currently available device processing resources 198 exceed the threshold 200, a full-quality version of the spiral effect may be applied. Since the currently available device processing resources 198 do not exceed the threshold 200 at time $t_B$, the reduced-quality version of the spiral effect may be applied at time $t_B$. As shown in FIG. 12, such a reduced-quality version of the spiral effect may employ fewer vertex transformations than the full-quality version to conserve the total amount of resources consumed. By way of example, in some embodiments, the reduced-quality version of the spiral effect may employ fewer than half or even fewer than one quarter the total number of vertex transformations computed by the full-quality version. In this way, the handheld device 50 may continue to apply the spiral effect, albeit with less complexity, despite changes in the device processing resources currently available.

Continuing to FIG. 13, a "brush-stroke" effect that may be triggered by motion of the handheld device 50 is illustrated, in accordance with aspects of the present disclosure. The brush-stroke effect may cause an image displayed on the handheld device 50 to be altered, such that the image appears as a plurality of "brush-like" strokes, wherein the direction of the strokes may be determined based on the direction of motion that the handheld device 50 experiences. For example, at time $t_A$, the handheld device 50 generally may be stationary and may display an image 146 of a subject 142 (e.g., using photo the browser application 66). From time $t_A$ to time $t_B$, the handheld device 50 may experience linear motion in the direction indicated by arrow 212. Thus, at time $t_B$, a brush-stroke effect may be applied to the image 146, such that the subject 142 appears as a number of brush-like strokes, each stroke generally being oriented in direction 212. Next, from time $t_B$ to time $t_C$, the handheld device 50 may experience linear motion in the direction indicated by arrow 214. As such, the image 146 is further altered at time $t_C$, such that the direction of the brush-strokes (representing subject 142) are re-oriented in direction 214. In some embodiments, the length, thickness, color, or distribution of the brush-strokes may be at least partially influenced by the velocity at which the handheld device 50 is moved and/or the amount of time over which the motion (e.g., 212 or 214) occurs.

To enable the handheld device 50 to continue to apply the brush-stroke effect despite changes in the currently available device processing resources, the handheld device 50 may variably apply a full-quality version or a reduced-quality version of the brush-stroke effect depending on the amount of device processing resources currently available. In some embodiments, such an application of the full-quality version or reduced-quality version of the brush-stroke effect may take place in real time. For example, as shown by a plot 202 of FIG. 13, available device processing resources (curve 204) may vary over time. While the currently available device processing resources 204 exceed a threshold 206 (e.g., at times $t_C$ and $t_B$), the handheld device 50 may apply a full-quality version of the brush-stroke effect. When the currently available device processing resources 204 do not exceed the threshold 206 (e.g., at time $t_C$), the handheld device 50 may apply a reduced-quality version of the brush-stroke effect. By way of example, the level of realism or detail of the full-quality version of the brush-stroke effect may be higher than that of the reduced-quality version, which may consume fewer resources than the full-quality version of the brush-stroke effect.

As can be appreciated, the various image alteration examples described herein are not intended to be limited to one type of device operation event 90. Indeed, a user may have the option of configuring image alteration effects to be triggered by different device operation events 90, or by a combination of multiple device operation events 90. Any suitable device operation event 90, alone or in combination with other device operation events 90, may be employed to affect the application of an image alteration effect 86.

Figure 14:
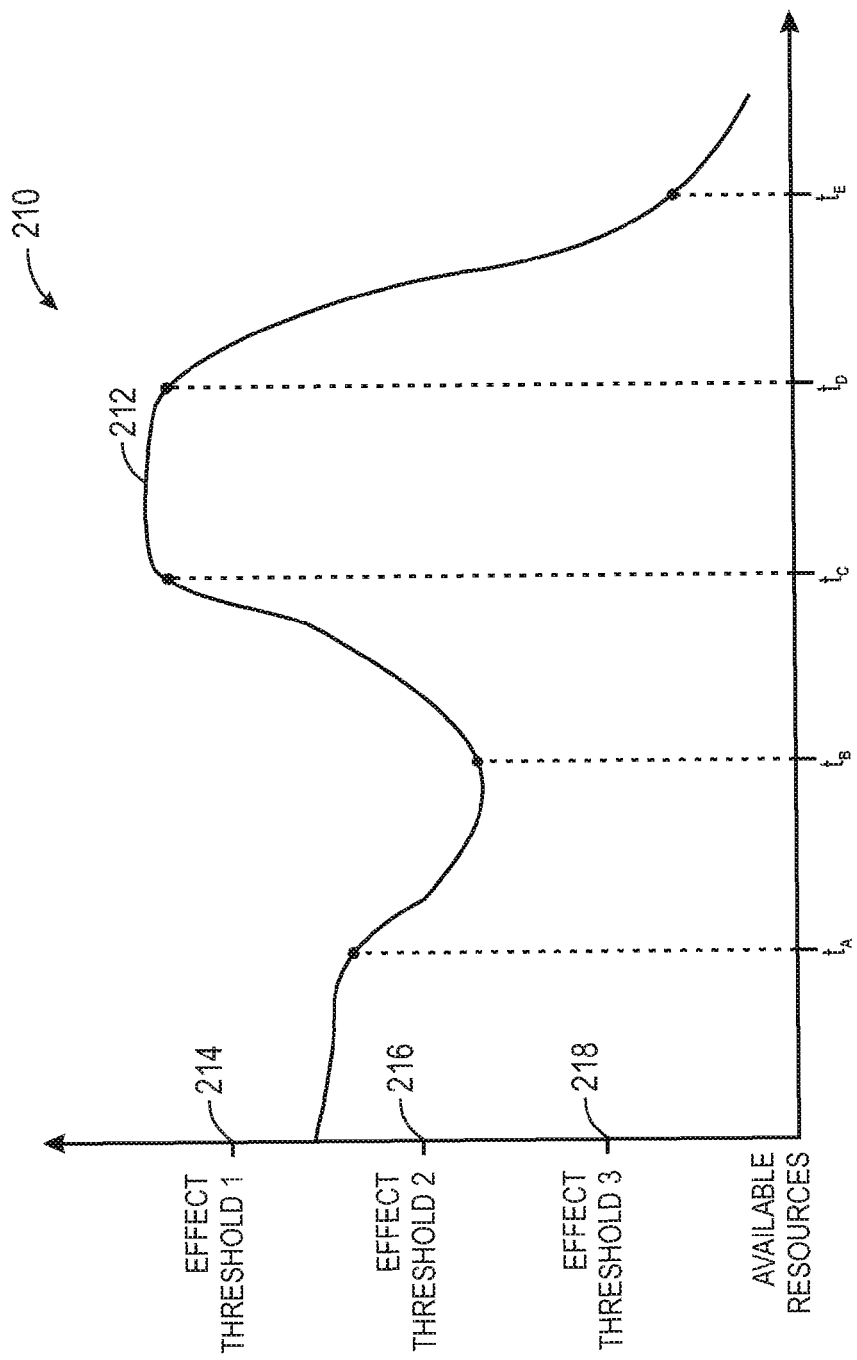
FIG. 14 is a plot modeling various levels of image alteration effect that may be applied depending on currently available device resources.

Moreover, while the above-discussed examples of applications of image alteration effects 86 have illustrated only the application of a full-quality version of the image alteration effect 86 or a single reduced-quality version of the image alteration effect 86, it should be appreciated that any suitable number of reduced-quality versions of the image alteration effect 86 may be employed. For example, as shown by a plot 210 of FIG. 14, when available device processing resources (curve 212) change over time, several different reduced-quality versions of an image alteration effect 86 may be applied. As particularly illustrated by the plot 210, a full-quality version of an image alteration effect 86 may be applied during times $t_C$ and $t_D$, when the currently available device processing resources exceed a first threshold 214. A first reduced-quality version of the image alteration effect 86 may be applied during time $t_A$, when the currently available device processing resources do not exceed the first threshold 214 but do exceed a second threshold 216. Such a first reduced-quality version of the image alteration effect 86 may be less complex, and thus less resource-intensive, than the full-quality version of the image alteration effect 86. A second reduced-quality version of the image alteration effect 86 may be applied during time $t_B$, when the currently available device processing resources do not exceed the second threshold 216 but do exceed a third threshold 218. The second reduced-quality version of the image alteration effect 86 may less complex, and thus less resource-intensive, than the first reduced-quality version of the image alteration effect 86. Finally, a third reduced-quality version of the image alteration effect 86 may be applied during time $t_E$, when the currently available device processing resources do not exceed the third threshold 218. The third reduced-quality version of the image alteration effect 86 may less complex, and thus less resource-intensive, than the second reduced-quality version of the image alteration effect 86.

Figure 15:
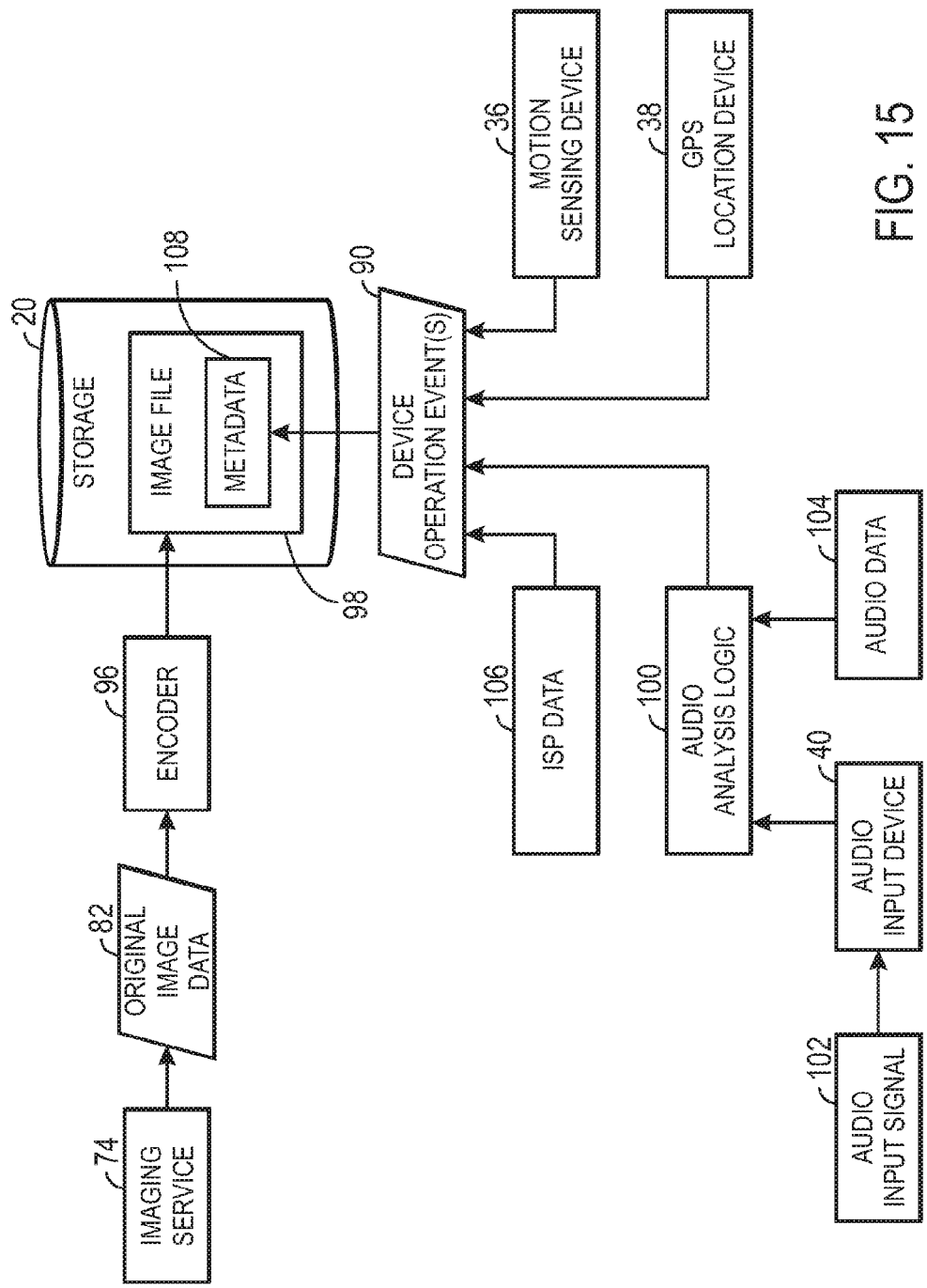
FIG. 15 is a schematic block diagram depicting the association of various events that may be detected during operation of the electronic device of FIG. 1 with image data, in accordance with aspects of the present disclosure.

Not every electronic device 10 may be capable of applying a full-quality version of an image alteration effect 86. Such electronic devices 10 may apply only reduced-quality versions of the image alteration effect 86. In addition, even an electronic device 10 capable of applying a full-quality version of an image alteration effect 86 still may occasionally lack the device processing resources to apply the full-quality version of the image alteration effect 86 in real time. To enable an image alteration effect 86 to be applied to images on such electronic devices 10 in full, certain embodiments of the electronic device 10 may store device operation events 90 that occurred while image data 82 is captured as metadata 108 in an image file 98, as illustrated in FIG. 15. At a later time, the same or another electronic device 10 may apply an image alteration effect 86 to the image data 82 based on the associated device operation events 90.

As shown in FIG. 15, original image data 82 may be obtained from an imaging service 74 and subsequently encoded in an encoder 96 to produce an image file 98. The image file 98 may be stored in the nonvolatile storage 20. As the original image data 74 is being captured by the imaging service 74, one or more device operation events 90 may be occurring. As noted above, such device operation events 90 may represent image events deriving from ISP data 106, audio events from the audio analysis logic 106 (which may analyze an audio signal 102 input to the audio input device 40 or previously obtained audio data 104), location events from the positioning device 38, and/or motion events from the motion sensing device 36. These device operation events 90 may be associated with the resulting image file 98 as metadata 108 or in a database associated with the image file 98. In some embodiments, the device operation events 90 associated with the image file 98 may be obtained at a different time than capture (e.g., when the electronic device 10 is applying an image alteration effect 86 as shown in FIG. 4 or 5).

Figure 16:
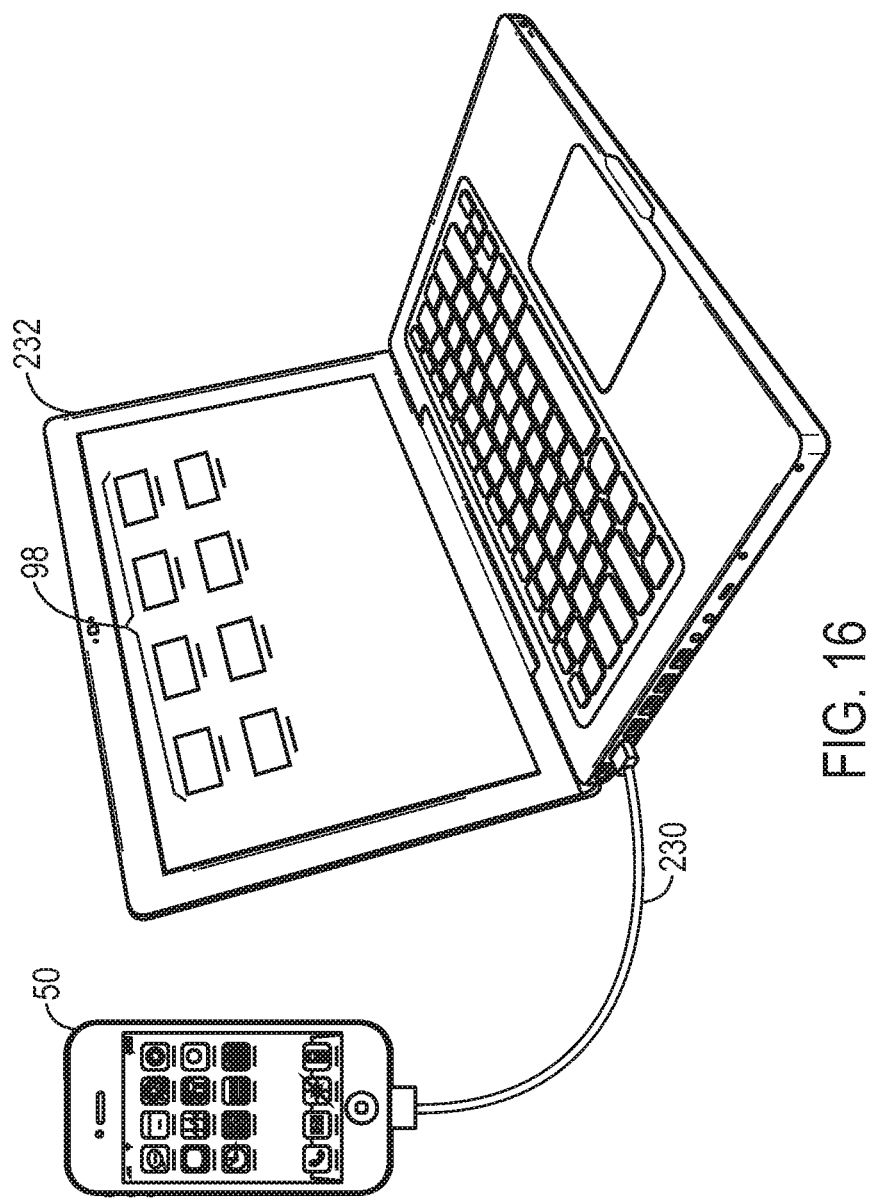
FIG. 16 is a perspective view of an image transfer from the electronic device of FIG. 1 to an electronic device having higher image processing bandwidth to enable higher-bandwidth image alteration, in accordance with aspects of the present disclosure.

When the image data 98 and one or more device operation events 90 are associated (e.g., via the metadata 108 of the image file 98), image alteration effects 86 may be applied to the image data 82 of the image file 98 independent of the electronic device 10 that produced the device operation events 90. That is, as shown in FIG. 16, such image files 98 may be transferred from one electronic device 10 (e.g., a handheld device 50) via a data connection 230 to another electronic device (e.g., a notebook computer 232). The handheld device 50 may have originally produced the device operation events 90 associated with image files 98, but the notebook computer 232 may have more image processing capabilities, and thus may be better suited to applying a full-quality version of an image alteration effect than the handheld device 50.

Figure 17:
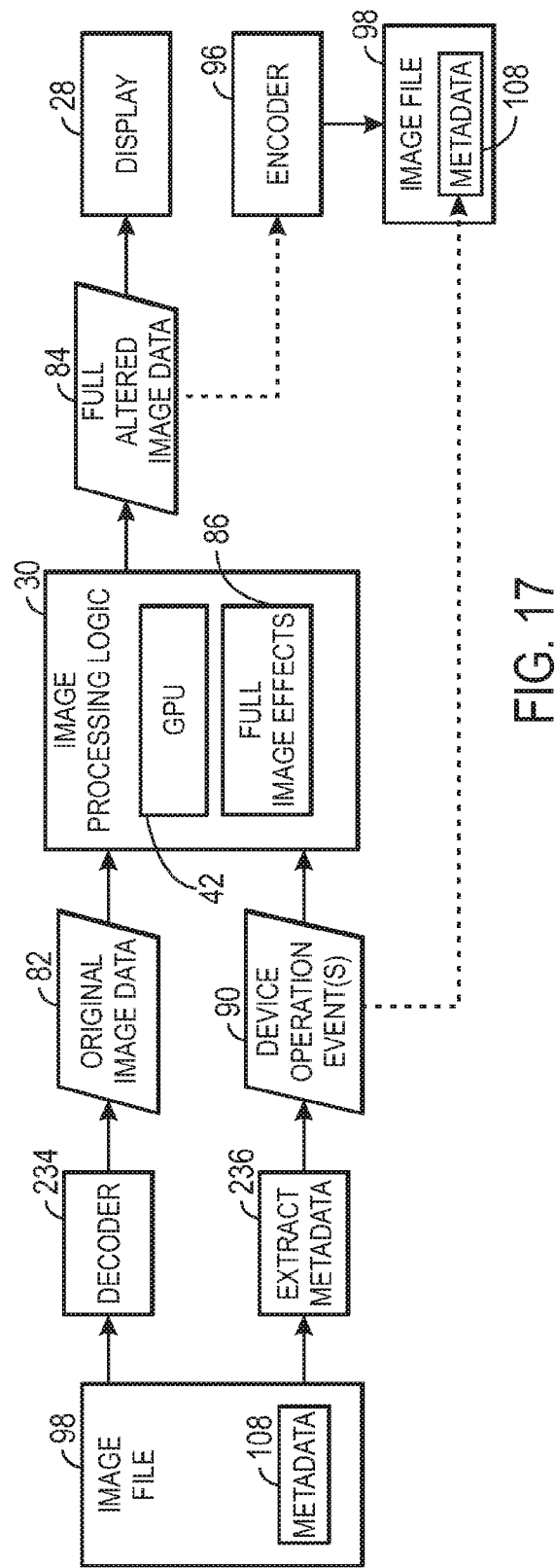
FIG. 17 is a schematic block diagram depicting a technique for altering image data based at least partly on previously recorded various device operation events that are associated with image data, in accordance with aspects of the present disclosure.

The notebook computer 232 may obtain both the original image data 82 and the associated device operation events 90 from an image file 98 transferred from another electronic device 10, as shown in FIG. 17. A decoder 234 may decode the image file 98 to obtain the original image data 82, while the device operation events 90 may be extracted 236 from the metadata 108. In some embodiments, the computer 232 may perform further analysis on the device operation events 90 or on other information present in the original image data 82 to determine certain device operation event 90 properties. By way of example, when the original image data 82 is a video file that includes an audio stream, the computer 232 may perform a full-quality version of a determination of an audio property (e.g., a frequency analysis) of the audio stream.

Image processing logic 30 of the computer 232 may apply an image alteration effect 86 to the image data 82 based at least partly on the associated device operation events 90. Altered image data 84 that results may be displayed on a display 28 or encoded by an encoder 96 to produce another image file 98. In some embodiments, the device operation events 90 originally associated with the original image file 98 also may be associated with the newly created image file 98 of altered image data 84 (to enable further image alteration effects 86 to be applied based at least partly on the device operation events 90 at a later time). Although the embodiment of FIG. 17 has been described as occurring within the computer 232, it should be understood that any other suitable electronic device 10 may apply the image alteration effects 86 to the image data 82 based at least partly on the device operation events 90 associated with the image file 98. In at least one embodiment, the application of the image alteration effect(s) 86 shown in FIG. 17 occur in an electronic device 10 (e.g., the notebook computer 232) having generally higher device processing resources than the electronic device 10 in which the device operation events 90 occurred (e.g., the handheld device 50).

Figure 18:
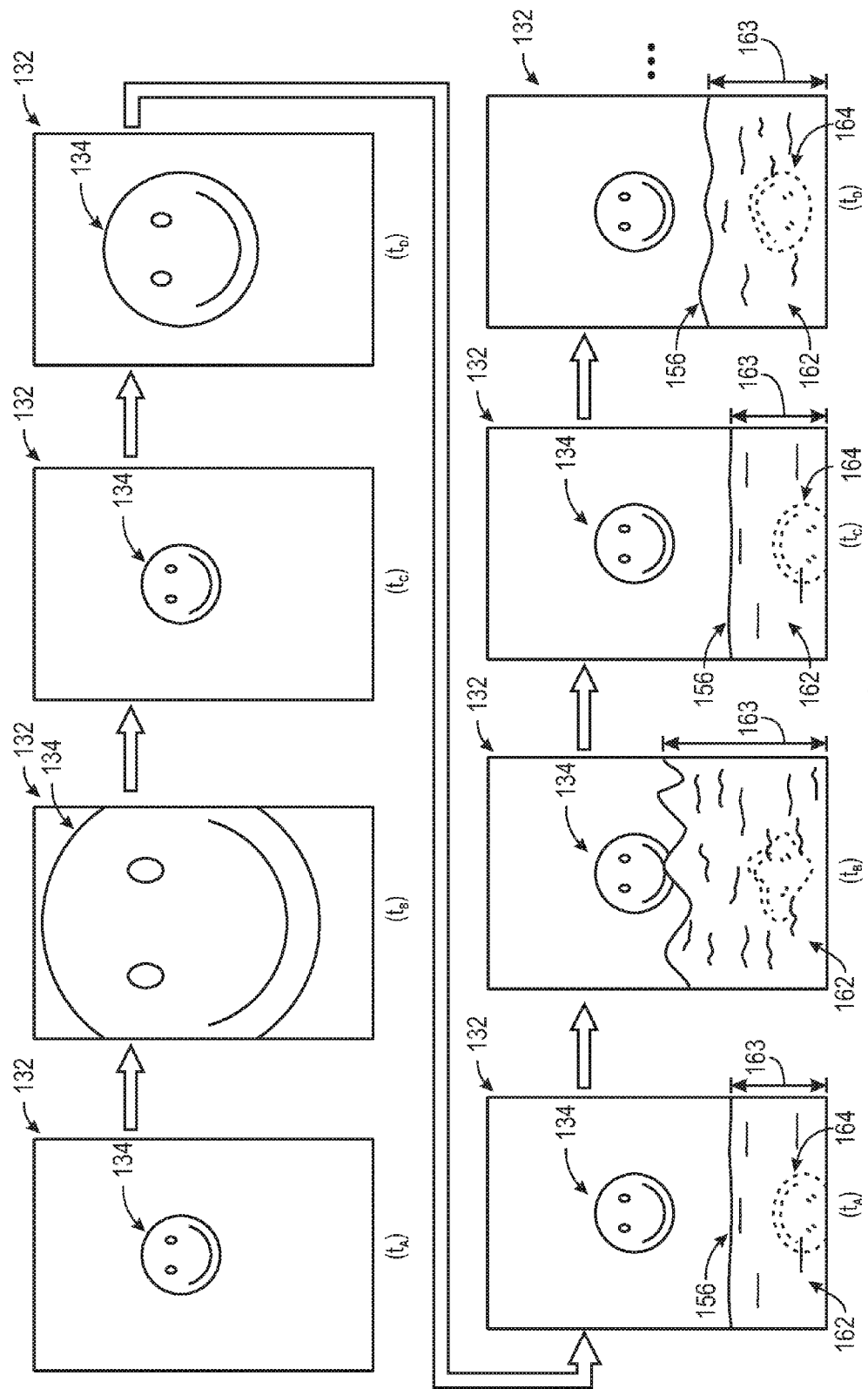
FIG. 18 illustrates an embodiment of a series of image alteration techniques that may be applied based on recorded device operation events associated with image data, in accordance with aspects of the present disclosure.

Since the image alteration effects 86 applied to the image data 82 in the flow diagram of FIG. 17 may be based at least partly on previously obtained device operation events 90 (e.g., from the metadata 108), rather than device operation events 90 being detected as the image alteration effects 86 are applied, many different types of image alteration effects 86 may be tested by a user before a desired image alteration effect 86 is ultimately selected. For example, FIG. 18 illustrates the application of an image alteration effect 86 based at least partly on the video images 134 and device operation event(s) 90 property 166 in the example of FIG. 11. In the example illustrated by FIG. 18, an electronic device 10 such as the computer 232 may loop the playback of video images 134 derived from an image file 98 transferred from another electronic device. Each time the video images 134 are looped, a different image alteration effect 86 may be applied. Since the device operation events 90 are associated with the image file 98, the device operation events 90 may remain the same each time the video images 134 loop.

In the example of FIG. 18, the device operation event 90 property upon which the application of the image alteration effect(s) 86 are applied may be the device operation event 90 property 166 shown in FIG. 11. When the video images 134 first begin to loop, a first image alteration effect 86 may be applied (e.g., the zooming effect) in accordance with the device operation event 90 property 166. Thus, since the device operation event 90 property 166 is low at times $t_A$ and $t_C$, the image alteration effect 86 may "zoom out" on the video image 134 at times $t_A$ and $t_C$. Since the device operation event 90 property 166 is relatively high at times $t_B$ and $t_D$, the image alteration effect 86 may "zoom in" on the video image 134 at times $t_B$ and $t_D$.

Next, the video images 134 may repeat with a different image alteration effect 86 but the same device operation event 90 property 166 (FIG. 11). For example, a water ripple effect may be applied in accordance with the same device operation event 90 property 166 with which the zooming effect was applied. Thus, since the device operation event 90 property 166 is low at times $t_A$ and $t_C$, the image alteration effect 86 may overlay a relatively small amount of the water-like graphical element 162 (e.g., reaching a relatively low height 163) onto the video image 134 at times $t_A$ and $t_C$. Since the device operation event 90 property 166 is relatively high at times $t_B$ and $t_D$, the image alteration effect 86 may overlay a relatively large amount of the water-like graphical element 162 (e.g., reaching a relatively high height 163) onto the video image 134 at times $t_B$ and $t_D$. This process of applying various image alteration effects 86 based at least partly on the same device operation event(s) 90 may continue for any suitable number of image alteration effects 86 as the video images 134 continue to loop. A user then may select the particular application of an image alteration effect 86 that the user finds most appealing (e.g., for encoding in the encoder 96 and storage as a new image file 98).

As will be appreciated, the various techniques described above and relating to alteration of image data based upon one or more device operation events are provided herein by way of example only. Accordingly, it should be understood that the present disclosure should not be construed as being limited to only the examples provided above. Indeed, many variations of the image alteration effects 86 set forth above may exist. Further, it should be appreciated that the above-discussed image alteration techniques may be implemented in any suitable manner. For instance, the image processing logic 30 may be implemented using hardware (e.g., suitably configured circuitry), software (e.g., via a computer program including executable code stored on one or more tangible computer readable medium), or via using a combination of both hardware and software elements. Through use of the disclosed image alteration techniques, a user may be able to exercise greater creativity in generating and displaying altered images that are not only creative, but also aesthetically pleasing. In this manner, the user may experience greater satisfaction when viewing such images, thereby improving the user's experience when interacting with electronic devices, such as devices 10 or 50.

Moreover, the technical effects of the present disclosure include, among other things, enabling electronic devices with various processing capabilities to apply the same general image alteration effects. That is, while some electronic devices at certain times may lack the device processing resources to apply a full-quality version of an image alteration effect in real time, the same electronic devices may be capable of applying a reduced-quality version of the same image alteration effect in real time. Likewise, even if one electronic device is only capable of a applying a reduced-quality version of an image alteration effect or has varied in applying full and reduced-quality versions of an image alteration effect, another electronic device may be capable of applying the full-quality version. As such, by associating the device operation events occurring when image data is originally captured on a first electronic device, a second electronic device may be able to apply a full-quality version of an image alteration effect to such image data according to the associated device operation events.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
 a data processing circuit to improve digital image altering capability of an electronic based device, the data processing circuit configured to:
  receive image data;
  detect the occurrence of a device operation event that comprises at least one of an audio event, a motion event, a location event, or an image event;
  modify the image data with an image alteration effect to construct a first altered image data in response to the detection of the occurrence of the device operation event;

display the first altered image data on a user display in real-time responsive to the occurrence of the device operation event, wherein the first altered image data is constructed by using a full-quality version of the image alteration effect associated with the device operation event when currently available device processing resources of the electronic device exceed a threshold or a reduced-quality version of the image alteration effect associated with the device operation event when the currently available device processing resources of the electronic device do not exceed the threshold;

automatically apply, after generation of the first altered image data with the reduced-quality version of the image alteration effect associated with the device operation event, the full-quality version of the image alteration effect to the received image data to create a second altered image data after the currently available device processing resources shifts from not exceeding the threshold to exceeding the threshold; and store the second altered image data.

2. The electronic device of claim 1, wherein the data processing circuitry is configured to vary between using the full-quality version of the image alteration effect and the reduced-quality version of the image alteration effect as the currently available device processing resources change in real time.

3. The electronic device of claim 1, wherein the image alteration effect comprises at least one of a sepia effect, a black and white effect, a glow effect, a colored pencil effect, a thermal camera effect, an x-ray effect, a pop art effect, a comic book effect, a bulge effect, a dent effect, a twirl effect, a squeeze effect, a mirror effect, a light tunnel effect, a fisheye effect, a stretch effect, a water reflection effect, a spiral effect, a depth-changing effect, a brush-stroke effect, or a night-vision effect, or some combination thereof.

4. The electronic device of claim 1, further comprising at least one of audio analysis logic configured to analyze an audio signal played back from audio data stored on the electronic device or to analyze an external audio signal received by an audio input device, a motion sensing device configured to detect motion experienced by the electronic device, a positioning device configured to detect a geographic position of the electronic device, or an imaging subsystem configured to detect one or more imaging properties, or some combination thereof;

wherein the data processing circuitry is further configured to detect the occurrence of the audio event, the motion event, the location event, or the imaging event based upon data provided by the audio analysis logic, the motion sensing device, the positioning device, or the imaging subsystem, respectively.

5. A method, comprising:
improving digital image altering capability of an electronic based device by performing at least the following:
receiving image data onto the electronic device;
detecting a device operation event configured to trigger alteration of the image data using the electronic device;
determining an amount of processing bandwidth available to the electronic device;
applying, on the electronic device, in real-time a full-quality version or one or more reduced-quality versions of an image alteration effect to the image data upon detection of the device operation event to alter the image data, wherein applying the full-quality version or the one or more reduced-quality versions of the image alteration effect comprises:
applying the one or more reduced-quality versions of the image alteration effect to the image data when the available processing bandwidth is below a first threshold to construct a first altered image data;
applying the full-quality version of the image alteration effect to the image data when the available processing bandwidth is not below the first threshold to construct the first altered image data; and
displaying the first altered image data on a display of the electronic device;
automatically applying the full-quality version of the image alteration effect to the image data to create a second altered image data once the available processing bandwidth transitions from below the first threshold to not below the first threshold when the first altered image data is constructed with the one or more reduced-quality versions of the image alteration effect, wherein the image alteration effect is associated with the device operation event; and
storing the second altered image data.

6. The method of claim 5, wherein the full-quality version and the one or more reduced-quality versions of the image alteration effect are variably applied in real time in response to changes in the available processing bandwidth.

7. The method of claim 5, further comprising, after the altered image data is displayed on the display:
displaying the second altered image data; and
encoding the second altered image to obtain an image file.

8. The method of claim 5, wherein applying either the full-quality version or the one or more reduced-quality versions of the image alteration effect comprises:
applying a first reduced-quality version of the image alteration effect to the image data when the available processing bandwidth is below the first threshold but not below a second threshold; and
applying a second reduced-quality version of the image alteration effect to the image data when the available processing bandwidth is below the second threshold.

9. The system of claim 1, wherein the motion event includes detecting rotational motion of the electronic device.

10. A system comprising:
a first electronic device to improve digital image altering capability, the first electronic device configured to:
capture image data using an image subsystem;
store the image data as an image file associated with one or more indications of one or more device operation events that occurred while the image data was captured, wherein the one or more device operation events comprise at least one of an audio event, a motion event, a location event, or an image event; and
construct a plurality of altered image data by modifying the image data with a plurality of altered image effects based on available processing resources and in response to detecting the one or more device operation events; and
a second electronic device configured to:
receive the image file;
display in real-time to the received image file, in succession and on an electronic display associated with the second electronic device, a plurality of different versions of the image file corresponding to the altered image data, wherein each different version of the image file corresponding to one of the altered image data is generated by applying a full-quality version of one of the image alteration effects to the image file based at least in part on the one or more indications of the one or more device operation events associated with the image file;
receive a user selection of one of the plurality of different versions of the image file; and
store a second image file based on the user selected version of the image file;
wherein the second image file is created by automatically applying the user selected image alteration effects based in part on the one or more device operation events.

11. The system of claim 10, wherein the first electronic device is further configured to apply a reduced-quality version of one or more of the plurality of image alteration effects to the image data to produce a first altered image data of the plurality of the alter image data and to display the first altered image data of the plurality of the alter image data on an electronic display of the first electronic device.

12. The system of claim 10, wherein the first electronic device is further configured to apply either the full-quality version or a reduced-quality version of one or more of the plurality of image alteration effects to the image data to produce a first altered image data of the plurality of the alter image data and to display the first altered image data of the plurality of the alter image data on an electronic display of the first electronic device, wherein the first electronic device is configured to apply the full-quality version when the currently available device processing resources of the first electronic device exceed a threshold and apply the reduced-quality version otherwise.

13. The system of claim 10, wherein the second electronic device is configured to apply a full-quality version of an analysis of an audio stream associated with the image file to determine a refined indication of one of the one or more indications of the device operation events.

14. An apparatus comprising:
a user display;
a memory coupled to the user display, wherein the memory include instructions encoded thereon when executed by at least one processor, causes the apparatus to:
receive image data at the memory;
detect an occurrence of a device operation event associated with the image data, the device operation event including at least one of an audio event, a motion event, a location event, or an image event;
apply, in response to the detection of the device operation event, a full-quality version of an image alteration effect associated with the device operation event to construct a first altered image data when currently available device processing resources of the apparatus exceeds a threshold;
apply, in response to the detection of the device operation event, a reduced-quality version of the image alteration effect to construct the first altered image data when the currently available device processing resources are less-than-or-equal-to the threshold;
display the first altered image data on the user display in real-time;
automatically apply, after display of the first altered image data and after the currently available device processing resources are determined to change from less-than-or-equal-to the threshold to greater-than the threshold, the full-quality version of the image alteration effect to the received image data to create a second altered image data; and
store the second altered image data.

15. The apparatus of claim 14, wherein the instructions when executed by the at least one processor further causes the apparatus to:
apply the reduced-quality version of the image alteration effect to construct the first altered image data when the currently available device processing resources are less-than-or-equal-to the threshold but not below a second threshold; and
apply a second reduced-quality version of the image alteration effect to construct the first altered image data when the currently available device processing resources are below the second threshold.

16. The apparatus of claim 14, wherein the full-quality version of the image alteration effect comprises vertex transformation calculations and the reduced-quality version of the image alteration effect comprises fewer vertex transformation calculations than the full-quality version of the image alteration effect.

17. The apparatus of claim 16, wherein the reduced-quality version of the image alteration effect comprises one-quarter or fewer the vertex transformation calculations of the full-quality version of the image alteration effect.

18. The apparatus of claim 14, wherein the full-quality version of the image alteration effect comprises an attenuated water ripple effect and the reduced-quality version of the image alteration effect comprises a sine-wave-based water ripple effect without attenuation.

19. The apparatus of claim 14, further comprising a motion sensor, wherein the motion event includes the motion sensor detecting rotational motion of the apparatus.

20. A method comprising:
receiving, by an electronic device, image data;
detecting, by the electronic device, an occurrence of a device operation event associated with the image data, the device operation event including at least one of an audio event, a motion event, a location event, or an image event;
applying, by the electronic device and in response to the detection of the device operation event, a full-quality version of an image alteration effect associated with the device operation event to construct a first altered image data when currently available device processing resources of the electronic device exceeds a threshold;
applying, by the electronic device and in response to the detection of the device operation event, a reduced-quality version of the image alteration effect to construct the first altered image data when the currently available device processing resources are less-than-or-equal-to the threshold;
displaying in real-time the first altered image data on a user display of the electronic device;
automatically applying, by the electronic device, after display of the first altered image data and after the currently available device processing resources are determined to change from less-than-or-equal-to the threshold to greater-than the threshold, the full-quality version of the image alteration effect to the received image data to create a second altered image data; and
store the second altered image data within memory of the electronic device.

21. The method of claim 20, further comprising
applying, by the electronic device, the reduced-quality version of the image alteration effect to construct the first altered image data when the currently available device processing resources are less-than-or-equal-to the threshold but not below a second threshold; and applying, by the electronic device, a second reduced-quality version of the image alteration effect to construct the first altered image data when the currently available device processing resources are below the second threshold.

22. The method of claim 20, wherein the indication of the device operation event is stored in metadata associated with the image file.

23. The method of claim 20, wherein the motion event includes the motion sensor detecting rotational motion of the electronic device.

\* \* \* \* \*